US009429989B2

(12) United States Patent
Small et al.

(10) Patent No.: US 9,429,989 B2
(45) Date of Patent: *Aug. 30, 2016

(54) INTERACTIVE ELECTRONIC DEVICE SHELL

(71) Applicant: T-Mobile USA, Inc., Bellevue, WA (US)

(72) Inventors: Andrea Small, Seattle, WA (US); Anthony Giardini, Seattle, WA (US); Ryan Wolfe, Seattle, WA (US); Joyce S. Chou, Seattle, WA (US); Jae Y. Lee, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/569,470

(22) Filed: Dec. 12, 2014

(65) Prior Publication Data

US 2015/0168999 A1   Jun. 18, 2015

Related U.S. Application Data

(63) Continuation of application No. 12/764,477, filed on Apr. 21, 2010, now Pat. No. 8,933,813.

(60) Provisional application No. 61/296,435, filed on Jan. 19, 2010.

(51) Int. Cl.
*G06F 1/16* (2006.01)
*F21V 1/00* (2006.01)
(Continued)

(52) U.S. Cl.
CPC ............... *G06F 1/1626* (2013.01); *F21V 1/00* (2013.01); *F21V 23/003* (2013.01);
(Continued)

(58) Field of Classification Search
CPC ........... H04M 19/04; H04M 2250/12; H04M 1/0266; G08B 5/36; G09F 9/33
USPC .......... 340/815.45; 345/173; 455/567, 575.1; 379/428.01; 362/84
See application file for complete search history.

(56) References Cited

U.S. PATENT DOCUMENTS 6,016,038 A   1/2000   Mueller et al.
6,122,631 A   9/2000   Berbec et al.
(Continued)

FOREIGN PATENT DOCUMENTS

KR   100668117 B1   1/2007
KR   20090034248 A   4/2009
KR   20090108359 A   10/2009

OTHER PUBLICATIONS

Halfbakery: LED Messaging Service, "Yet Another Way to Communicate via Cell Phone", retrieved Mar. 17, 2010 at <<http://www.halfbakery.com/idea/LED_20Messaging_20Service>>, 2 pgs.

(Continued)

*Primary Examiner* — Jack K Wang
(74) *Attorney, Agent, or Firm* — Lee & Hayes, PLLC

(57) ABSTRACT

An interactive electronic device shell and light source may enable personalization and increased functionality of an electronic device. The shell may at least partially cover a light source and attach to an electronic device. The shell includes at least some transparent or translucent portions (e.g., light stencils) that enable light from a matrix of the light source to emit through the shell, thus causing a display of light from the shell. In some aspects, the electronic device may be linked with the shell and/or the light source to control light emission through the shell. In various aspects, an illumined portion of the shell may have significance, such as revealing an artistic design or indicating a message based on activity of the electronic device.

18 Claims, 20 Drawing Sheets

(51) Int. Cl.
*F21V 23/00* (2015.01)
*F21V 33/00* (2006.01)
*F21V 8/00* (2006.01)
*H04M 1/02* (2006.01)
*H04M 1/22* (2006.01)
*H04M 1/725* (2006.01)
*F21Y 105/00* (2016.01)

(52) U.S. Cl.
CPC ........ *F21V 33/0004* (2013.01); *G02B 6/0005* (2013.01); *G02B 6/0008* (2013.01); *G06F 1/165* (2013.01); *G06F 1/1656* (2013.01); *H04M 1/0283* (2013.01); *H04M 1/22* (2013.01); *H04M 1/72575* (2013.01); *F21Y 2105/001* (2013.01); *G02B 6/0095* (2013.01)

(56) References Cited

U.S. PATENT DOCUMENTS

| | | | |
|---|---|---|---|
| 6,720,863 | B2 | 4/2004 | Hull et al. |
| 6,721,545 | B2 | 4/2004 | Doi |
| 6,771,981 | B1 | 8/2004 | Zalewski et al. |
| 6,944,482 | B2 | 9/2005 | Engstrom et al. |
| 6,954,658 | B2 | 10/2005 | Engstrom et al. |
| 6,981,791 | B2 | 1/2006 | Higashiyama |
| 7,072,621 | B1 | 7/2006 | Engstrom et al. |
| 7,096,046 | B2 | 8/2006 | Shapiro et al. |
| 7,133,707 | B1 | 11/2006 | Rak et al. |
| 7,156,311 | B2 | 1/2007 | Attia et al. |
| 7,212,839 | B2 | 5/2007 | Engstrom et al. |
| 7,287,696 | B2 | 10/2007 | Attia et al. |
| 7,571,328 | B2 | 8/2009 | Baumert et al. |
| 7,612,997 | B1 | 11/2009 | Diebel et al. |
| 7,907,935 | B2 | 3/2011 | Le Saint et al. |
| 8,042,163 | B1 | 10/2011 | Karr et al. |
| 8,082,353 | B2 | 12/2011 | Huber et al. |
| 8,094,551 | B2 | 1/2012 | Huber et al. |
| 8,179,847 | B2 | 5/2012 | Huber et al. |
| 8,209,745 | B2 | 6/2012 | Huber et al. |
| 8,370,180 | B2 | 2/2013 | Scott et al. |
| 8,495,381 | B2 | 7/2013 | Priebatsch |
| 2002/0147035 | A1 | 10/2002 | Su |
| 2003/0210780 | A1 | 11/2003 | Pratt et al. |
| 2004/0186768 | A1 | 9/2004 | Wakim et al. |
| 2005/0163940 | A1 | 7/2005 | Liang et al. |
| 2006/0052063 | A1 | 3/2006 | Lohr |
| 2006/0116184 | A1 | 6/2006 | Hayashi |
| 2007/0186099 | A1 | 8/2007 | Beck et al. |
| 2007/0243911 | A1 | 10/2007 | Saito |
| 2008/0127320 | A1 | 5/2008 | De Lutiis et al. |
| 2008/0189543 | A1 | 8/2008 | Parkinson |
| 2008/0204268 | A1 | 8/2008 | Dowling et al. |
| 2008/0244721 | A1 | 10/2008 | Barrus et al. |
| 2009/0288140 | A1 | 11/2009 | Huber et al. |
| 2009/0288145 | A1 | 11/2009 | Huber et al. |
| 2010/0123666 | A1 | 5/2010 | Wickholm et al. |
| 2010/0138916 | A1 | 6/2010 | Price, III et al. |
| 2010/0251352 | A1 | 9/2010 | Zarchy et al. |
| 2010/0321275 | A1 | 12/2010 | Hinckley et al. |
| 2010/0331054 | A1 | 12/2010 | Roberts et al. |
| 2011/0157866 | A1* | 6/2011 | Li .................... H04M 1/0266 362/84 |

OTHER PUBLICATIONS

Office Action for U.S. Appl. No. 12/764,574, mailed on Jan. 10, 2014, Andrea Small, "Element Mapping to Control Illumination of a Device Shell", 12 pages.

Office Action for U.S. Appl. No. 12/764,376, mailed on Dec. 10, 2013, Andrea Small, "Accessory Based Data Distribution", 15 pages.

Non-Final Office Action for U.S. Appl. No. 12/764,477, mailed on Feb. 11 2013, Andrea Small et al., "Interactive Electronic Device Shell", 9 pages.

Non-Final Office Action for U.S. Appl. No. 12/764,574, mailed on Mar. 14, 2013, Andrea Small et al., "Element Mapping to Control Illumination of a Device Shell", 14 pages.

Non-Final Office Action for U.S. Appl. No. 12/764,376, mailed on Mar. 20, 2013, Andrea Small et al., "Accessory Based Data Distribution", 13 pages.

Office Action for U.S. Appl. No. 12/764,477, mailed on Mar. 28, 2014, Andrea Small, "Interactive Electronic Device Shell", 12 pages.

Office Action for U.S. Appl. No. 12/764,376, mailed on Aug. 1, 2013, Small et al., "Accessory Based Data Distribution",15 pages.

Office Action for U.S. Appl. No. 12/764,574, mailed on Aug. 29, 2013, Small et al., "Element Mapping to Control Illumination of a Device Shell", 13 pages.

Office action for U.S. Appl. No. 12/764,477, mailed on Aug. 9, 2013, Small et al., "Interactive Electronic Device Shell", 10 pages.

PCT Search Report and Written Opinion mailed Jun. 29, 2011 for PCT Application No. PCT/US10/56159, 9 pgs.

"The New LG dLite", retrieved Sep. 2, 2010 from <<http://www.dlitebylg.com/pdf/dLite_specs.pdf>>, 3 pgs.

* cited by examiner

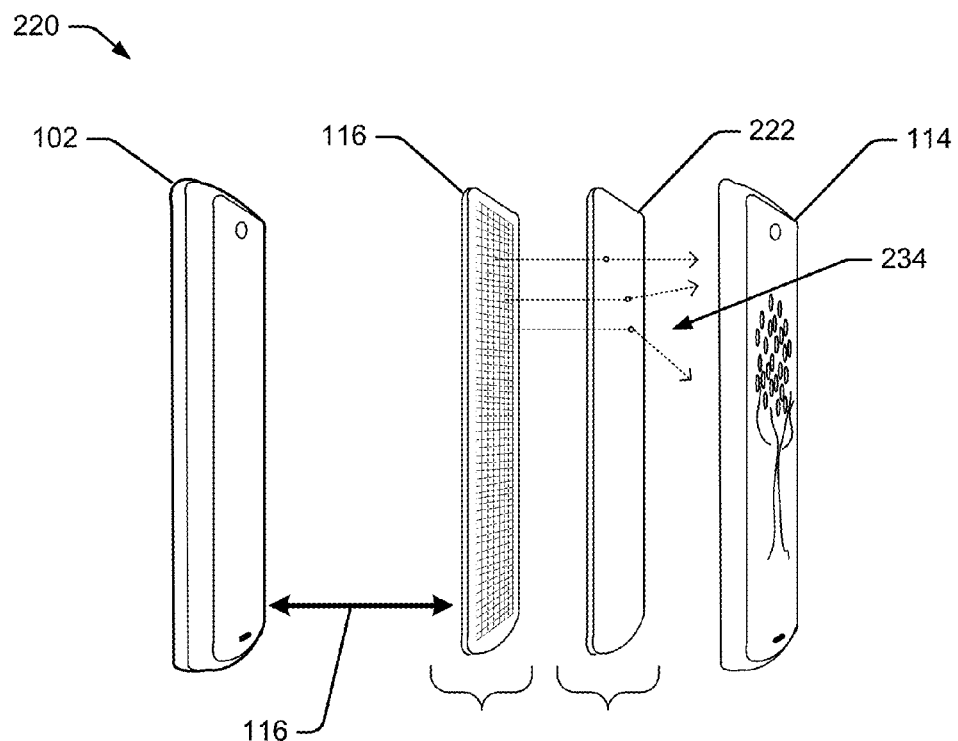
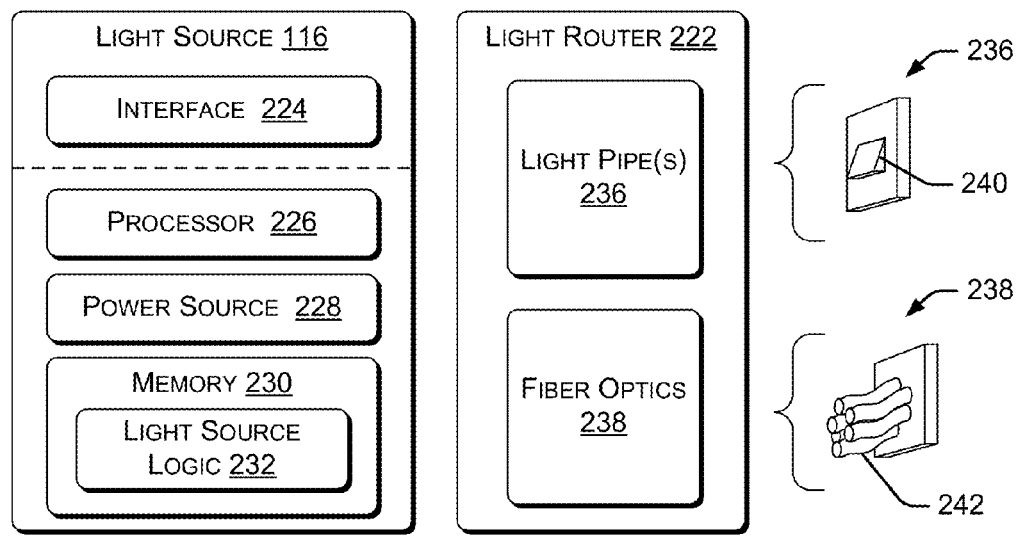
FIG. 2b

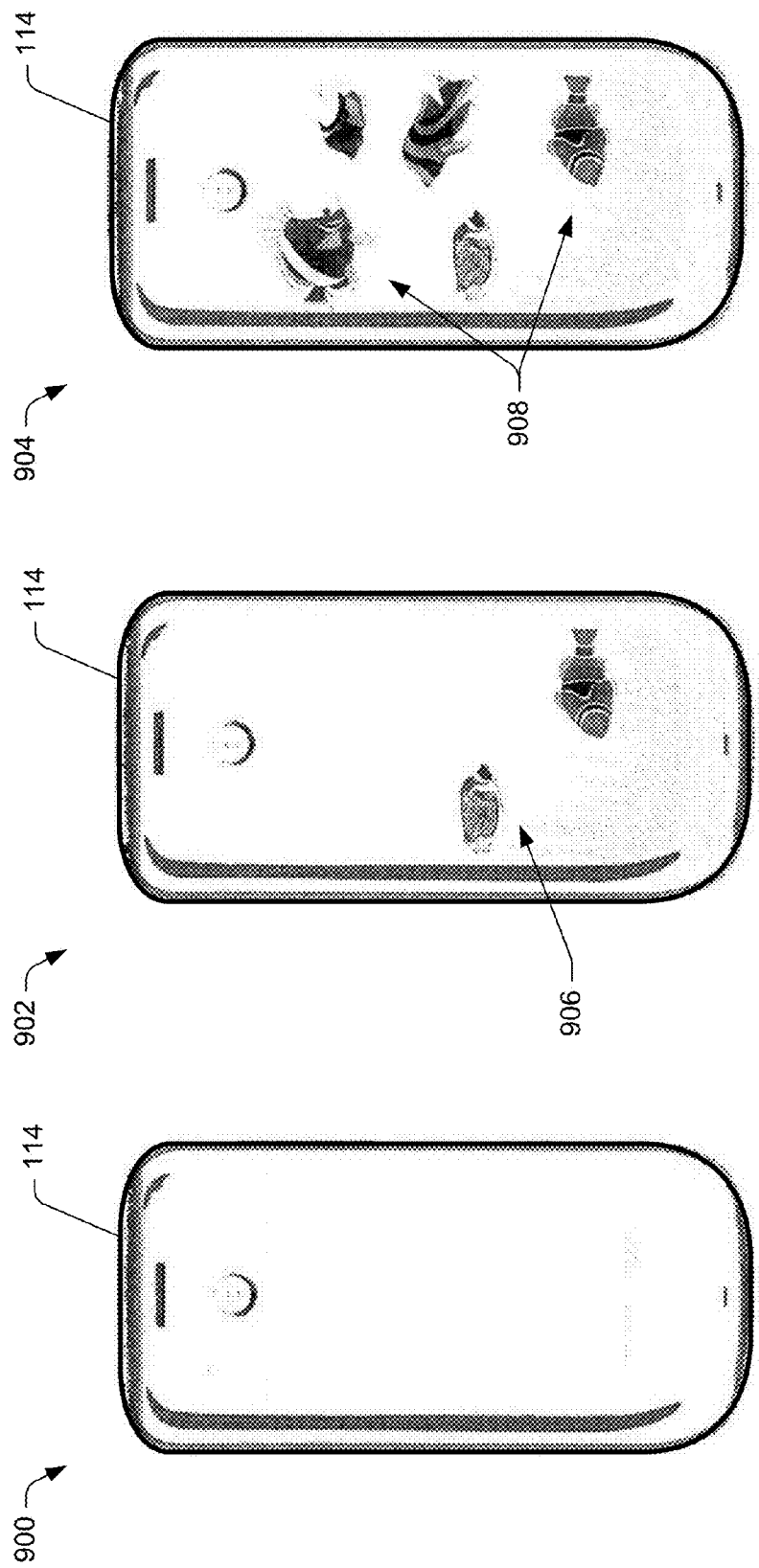

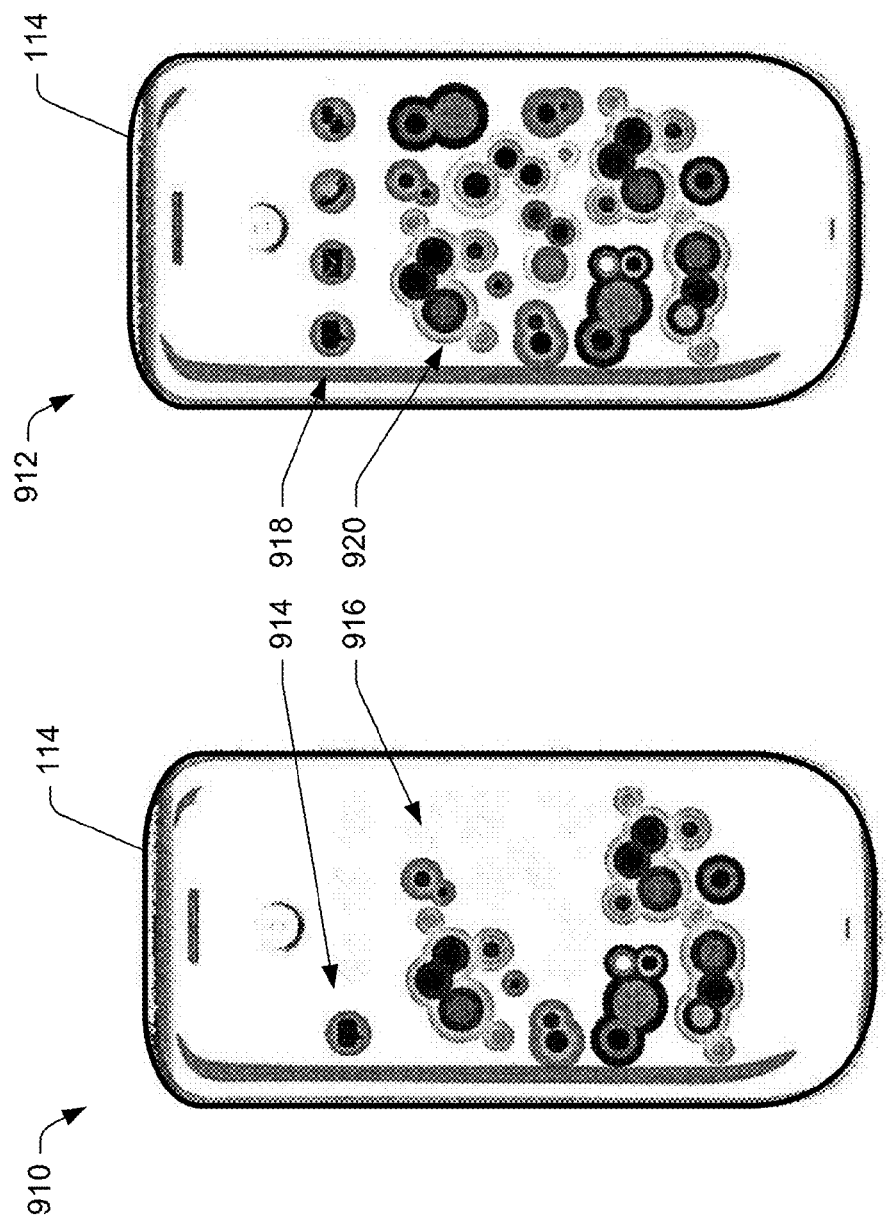

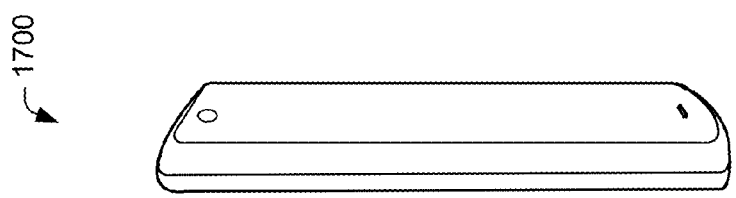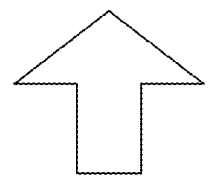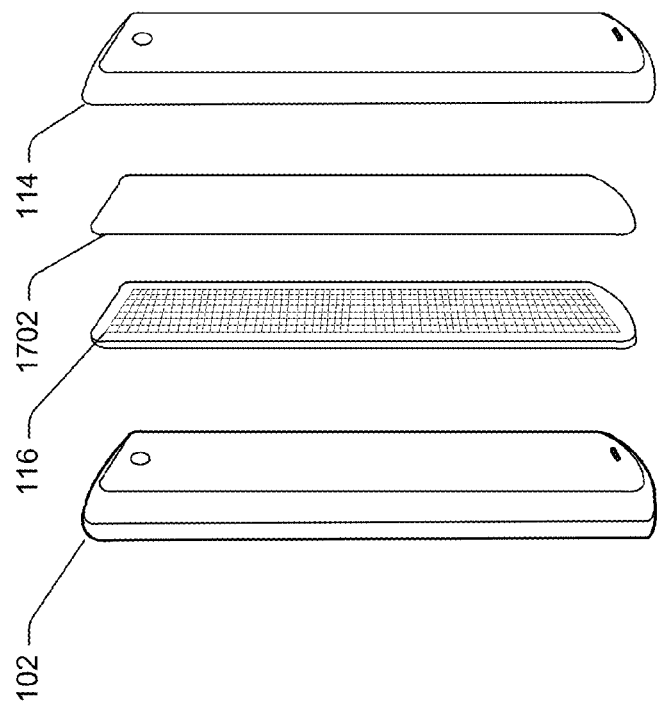
FIG. 17

INTERACTIVE ELECTRONIC DEVICE SHELL

CROSS REFERENCE TO RELATED PATENT APPLICATIONS

This patent application claims priority to U.S. application Ser. No. 12/764,477, entitled "Interactive Electronic Device Shell", filed Apr. 21, 2010, which claims priority to U.S. Provisional Patent Application No. 61/296,435, entitled "Lightbright", filed Jan. 19, 2010, which applications are incorporated herein in their entirety by reference.

This patent application is also related to co-pending, commonly-owned U.S. patent application Ser. No. 12/764,574, entitled "Element Mapping to Control Illumination of a Device Shell" and U.S. patent application Ser. No. 12/764,376, entitled "Accessory Based Data Distribution", both filed concurrently herewith, which applications are hereby incorporated in their entirety by reference.

BACKGROUND

Today, people are faced with many types of electronic devices such as telecommunications devices, computers, music players, or other electronic devices. Many of these electronic devices are manufactured on a large scale, which make personalization difficult and expensive. Often, these electronic devices are intended to operate over a period of years, which make their design susceptible to becoming dated over time.

Many people enjoy personalizing their belongings. For example, many people personalize their mobile telephones with ringtones, stickers, skins and other accessories, and their personal computers with wallpapers, to express themselves and distinguish their devices from the devices of others. In addition to personalization, people like their devices to have increased functionality. For example, many electronic devices can perform multiple operations such as a mobile telephone operating as a calculator, a music player, and/or a camera. In addition, people often prefer to use personalization when increasing the functionality of their device, such as adding ringtones that indicate a call is from a user-assigned contact (e.g., ringtone "a" for mom and ringtone "b" for other contacts). In addition, many people are concerned about the confidentiality of data, such as e-mails, text messages, multimedia messages, and other content that may be received by, sent from, or otherwise reside on their devices. Thus, people value surreptitious forms of communication which may indicate that a particular type of communication has been received on their devices.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIGS. 2b and 2c are schematic diagrams of an illustrative architecture that includes an illustrative light source and an illustrative light router.

FIGS. 9a, 9b, and 9c show messaging by an illustrative shell having segmented transparent portions that cover a light source. FIGS. 9d and 9e show messaging by another illustrative shell.

FIG. 17 is an exploded view of the electronic device having a shell that covers a touch interface and a light source.

DETAILED DESCRIPTION

Overview

An interactive electronic device shell ("shell") and light source may enable a user to personalize, increase functionality of, and/or provide short form modes of communication on an electronic device. The shell may be a cover, skin, or other attachable component that at least partially covers a light source and attaches to an electronic device and enables lighted or illuminated presentation of information or content to the user of the electronic device. In some embodiments, the shell may at least partially cover a light source (e.g., light panel, matrix, etc.) that is either incorporated into the shell, separately attachable to the electronic device, or incorporated into the electronic device. The shell may include at least some partially transparent or translucent portions or segments that enable light from the light source to emit through the partially transparent or translucent portions. In some embodiments, the shell may incorporate a light router (e.g., light pipes, diffuser, etc.) to device light source which, when illuminated, may transport light to one or more portions of the shell. In some embodiments, the display of light may reveal a design in the shell. The design may be artistic or functional (e.g., reveal information to the user).

In accordance with various embodiments, the electronic device may communicate with the shell and/or the light source to control light emission through the shell. For example, the electronic device may control the light source to illuminate at least a portion (e.g., bulb, segment, etc.) of the light source, which in turn illuminates a respective portion of the shell. In embodiments that use light routing, the electronic device may control one or more light sources that, via the light routers (e.g., light piping, etc.) illuminate at least selected portions of the shell. The illuminated portion of the shell may have significance to the user of the electronic device, such as revealing an artistic design and/or indicating a message based on an activity of the electronic device.

The interactive electronic device shell and light source described herein may be implemented in a number of ways. Example implementations are provided below with reference to the following figures. Although the disclosure uses a telecommunications device to represent the electronic device, the disclosure may be implemented on any type of electronic device and is not limited to a telecommunications device.

Illustrative Environment

Figure 1:
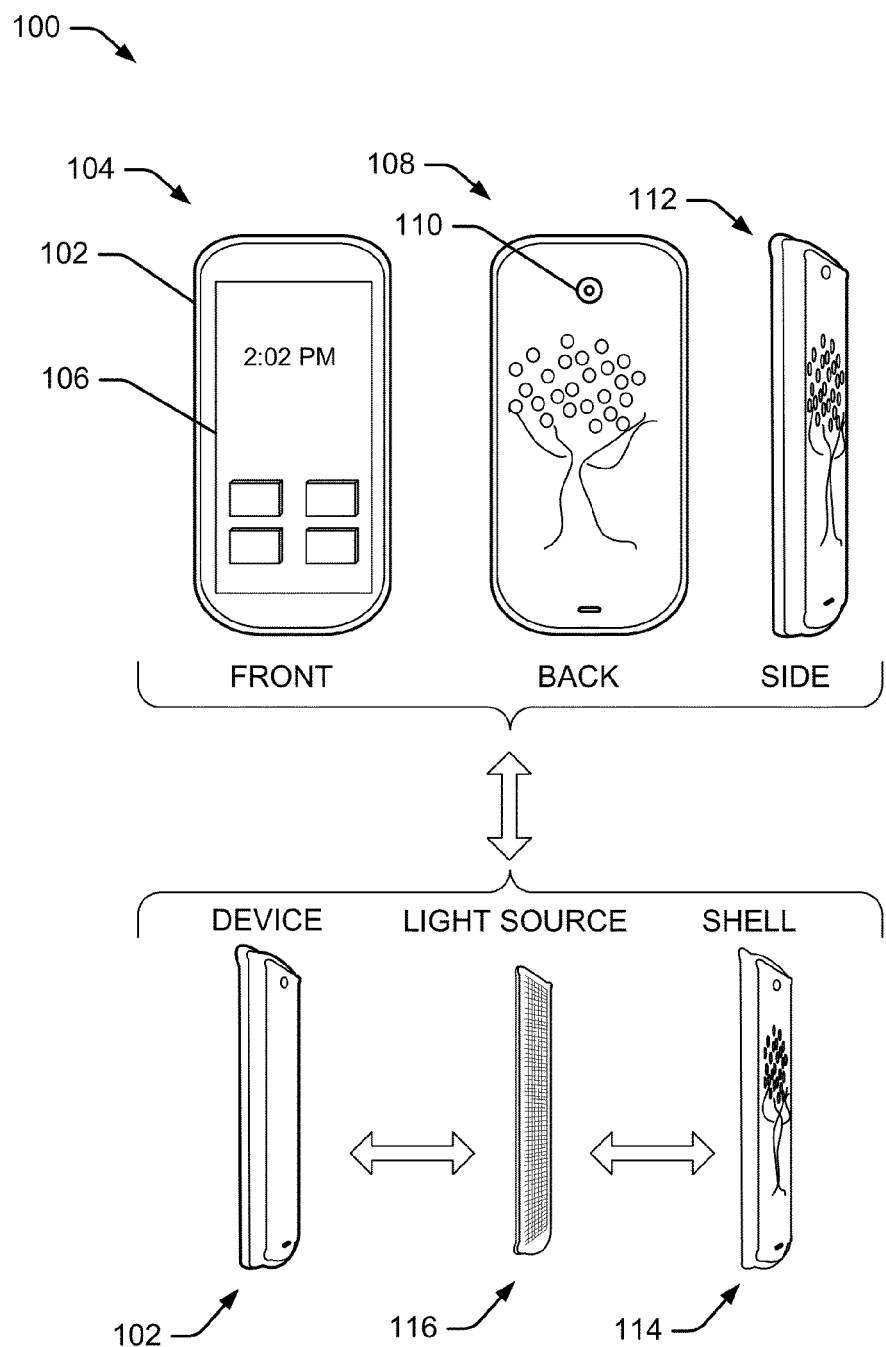
FIG. 1 is a schematic diagram of illustrative components of an electronic device configured with a partially transparent shell that covers a light source.

FIG. 1 is a schematic diagram of illustrative components 100 of an electronic device configured with a shell that covers a light source. FIG. 1 shows various views of the components to illustrate interaction of the components.

An electronic device 102 may include a front side 104 having a primary display 106 and a back side 108 that may include various components, such as a camera 110, or other features (e.g., contours, attachments, etc.). In an embodiment in which the shell is substantially rigid shell (e.g., high molecular mass polymers, etc.), the shell may enable attachment to sides 112 of the electronic device.

In accordance with various embodiments, the shell 114 may include a light router that may be aligned with one or more light sources of the electronic device 102 when the shell 114 is attached to the electronic device 102. In those instances, light sufficient to illuminate portions of the shell 114 is provided by the electronic device 102 and transmitted (channeled) through one or more light router features (light pipes, diffuser, etc.), thereby causing illumination of one or more portions of the shell 114.

In accordance with some embodiments, the shell 114 is a partially transparent or translucent shell that covers a light source 116. In some embodiments, the light source 116 may be a panel and/or a matrix of lights or light sections which, when illuminated, illuminate the partially transparent or translucent portions of the shell 114. The lights may be individual lights (e.g., light emitting diodes (LEDs), etc.) or a panel of segmented lights (e.g., electroluminescence (EL), liquid crystal displays (LCD), etc.).

The shell 114 may be configured for a particular instance of the light source 116 or may be replaceable with other shells that may be used with the light source 116 and are compatible with the electronic device 102. The shell 114 may couple to the electronic device 102 and/or the light source 116 via snap attachments, adhesives, screws, or other removable or non-removable attachments. In some embodiments, the shell 114 is made to be removable from the electronic device 102 to enable switching to a different shell, replacement of the light source 116, maintenance, and so forth.

By coupling the shell 114 over the light source 116 and to the electronic device 102, such as on the back side 108 via features on the sides 112 of the electronic device, users may personalize and/or add functionality to the electronic device. The shell 114 may include artistic, aesthetic, and/or functional designs (e.g., stencils, etc.), which may be visible upon illumination of the light source 116. The functional designs may be created by stencils that allow light to pass through portions of the shell, variations in edges of the shell or create reflections of light, different shell materials (colors, levels of transparency or translucency), and/or other shell attributes that enable rendering various amounts of light through some or all of the shell. In embodiments that include the light router, the functional designs may be created by light pipes, by stencils, different shell materials, or otherwise as described above.

The light source 116 may be a matrix of lights or light portions. The lights (or portions) may use electroluminescence (EL), light emitting diodes (LED), liquid crystal display (LCD), or other light sources that use minimal power and require minimal space for implementation. The light source (e.g., panels) may or may not be capable of emitting different colors of light across the spectrum of visible light, thus may be implemented as mono-color or multi-color light panels. The light source 116 may be incorporated into the electronic device 102, may be attachable to the electronic device 102, may be attachable to the shell 114, or may be incorporated into the shell 114. In an example implementation, the light source 116 may include two or more LEDs that emit light into a first end of light pipes (e.g., fiber optics, diffuser, etc.) that transport the light to a second end of the light pipes to illuminate a portion of the shell 114. The light source 116 may cover a large or small portion of a side of the electronic device 102 depending on the number of lights or panels, lighting needs, and so forth.

Figure 2A:
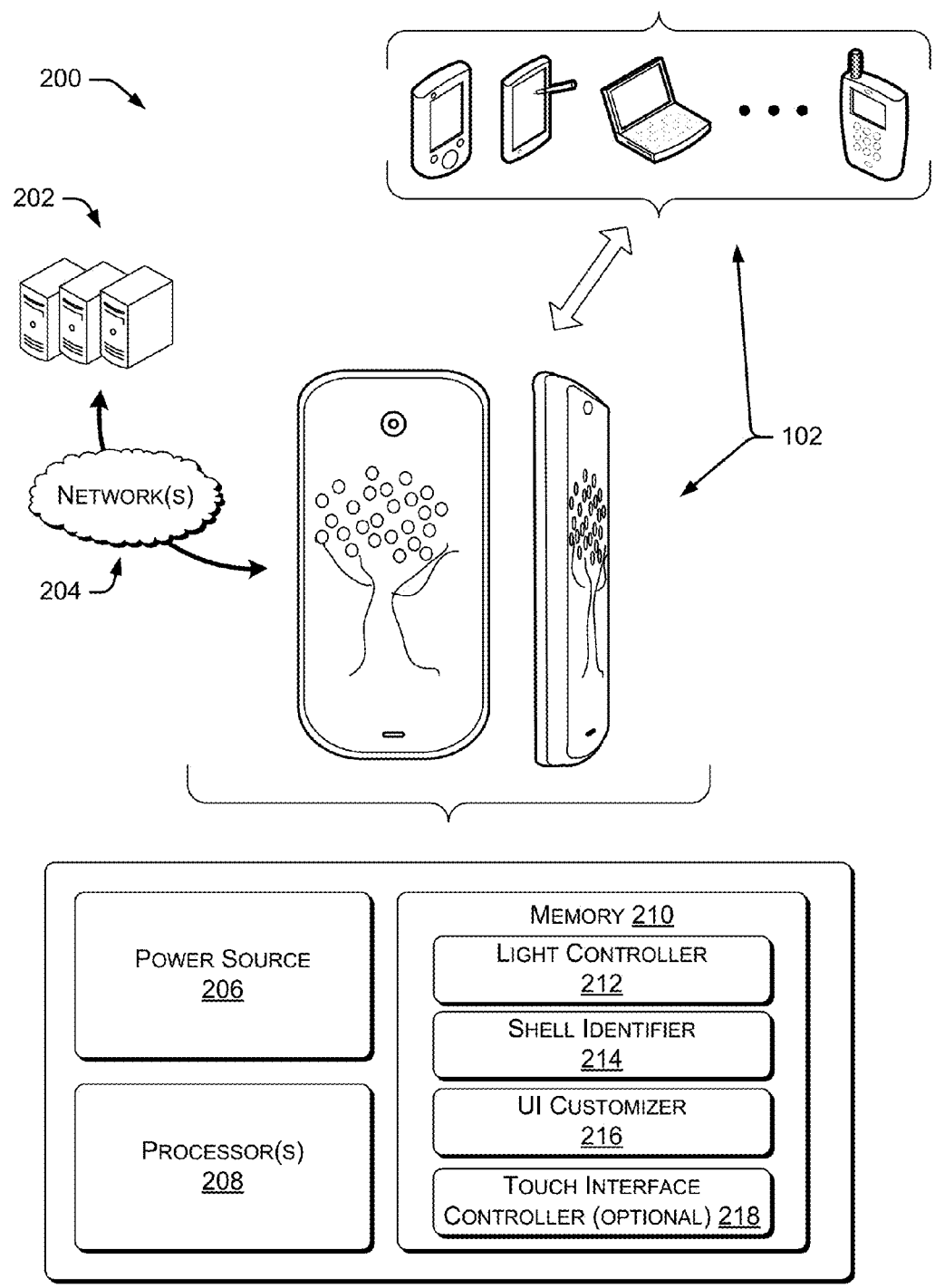
FIG. 2a is a schematic diagram of an illustrative system that includes an electronic device with a partially transparent shell that covers a light source

FIG. 2a is a schematic diagram of an illustrative system 200 that includes an electronic device 102, a shell 114, and a light source 116. The system 200 is described with reference to the components 100 of FIG. 1. The electronic device 102 light source 116 may be any type of electronic device, such as a telecommunications device, personal computer, table computer, personal digital assistance (PDA), a gaming device, and so forth.

In some embodiments, the electronic device 102 may be capable of exchanging data with a data source 202 via a network 204. The network 204 may be any type of wired or wireless network, such as but not limited to a mobile or cellular telecommunications network, the Internet, or another type of network. The electronic device 102 and the data source 202 may exchange data via wired or wireless transmissions, which may include wireless transmissions (e.g., 3G, Wi-Fi, Bluetooth, etc.), optical transmissions, and/or cable transmissions (e.g., universal serial bus (USB), Ethernet, etc.). The data source 202 may be any of a service provider, one or more servers, a storage device, or a combination thereof that is made accessible to the electronic device 102.

In some embodiments, the electronic device 102 may be capable of exchanging data with the shell 114. For example, the electronic device 102 may be configured with one or more device ports specific to the shell 114, thereby enabling physical connectivity and communication between the electronic device 102 and the shell 114. In some embodiments, the physical connectivity may be a mechanical connectivity, such as using a unique pin configuration to identify the shell. For example, the electronic device 102 may include a near field interface that performs a function of transmitting and receiving near field communications via a near field antenna. As another example, the shell 114 may be communicative with the electronic device 102 via a Bluetooth® or radio frequency identification (RFID) interface. Further, the near field interface may be used for other functions, as is known in the art, such as communicating directly with nearby devices that are also, for instance, Bluetooth® or RFID enabled. A reader/interrogator_ may be incorporated into electronic device 102.

The electronic device 102 may include a power source 206, one or more processor(s) 208, and memory 210. The power source 206 may power the electronic device 102 and/or the light source 116. In some embodiments, the light source 116 may include a separate power source. The memory 210 may store various modules which may perform functions or control aspects of the light source 116 and/or the shell 114. The modules may include, without limitation, a light controller 212, a shell identifier module 214, a shell/light user interface (UI) customizer 216, and a touch interface controller (optional) 218, or any combination thereof.

In accordance with some embodiments, the light controller 212 may detect and control operation of the relevant light-emitting medium, such as light piping or light source 116. For example, the light controller 212 may activate/deactivate lights, light pipes, or light segments in a matrix of a light source 116. The activation/deactivation may be based on programmed or user-configurable events, such as without limitation, missed calls, messages waiting, text message, emails, date/time information, artistic designs (e.g., screensaver, visualize display, etc.), and so forth. In some embodiments, the activation/deactivation may be based on events related to contacts (associates and friends of the user), such as a status update of a contact, missed call from the contact, etc. In various embodiments, the activation/deactivation may be based on multiple events, such that the light source is used to provide information on various events and/or contacts (e.g., light assigned to a missed call and another light assigned to activity of friend named Jane, who may have logged into social network site, etc.). The light controller 212 may be updated with data downloaded from external sources (such as the data source 204) to update software to control light source 116 emissions. Different instances of the light controller 212 may be used based on a configuration of a matrix of the lights (e.g., number and/or shape of the light sources, etc.). For example, when a different light source is coupled to the electronic device 102, the light controller 212 may be replaced or updated. In some embodiments, the light controller 212 may run a sleep mode to dim the light source 116 to conserve energy of the battery source 206. In various embodiments, the light controller 212 may be active when the electronic device 102 is otherwise operating in a low power state thus enabling messaging via the shell 114 without powering other components of the electronic device (e.g., the primary display, etc.). The light controller 212 may cause the light source 116 to 'wake' (illuminate) when the phone is in use and 'sleep' (discontinue illumination) after a predetermined duration when the electronic device 102 is inactive (or vice versa).

The shell identifier module 214 may identify the shell 114. In some embodiments, a variety of shells may be available, where the shells have different transparency, translucency or light emission features (e.g., artistic, functional, etc.). The shell identifier module 214 may identify the shell 114 that is attached to the electronic device 102. The shell 114 may be identified to the electronic device 102 in a variety of ways. For example, in an implementation, electronic device 102 may provide physical ports into which corresponding ports (such as mini USB ports) in the shell 114 may be inserted, thereby resulting in physical connectivity between the telecommunications device 102 and the shell 114. The shell identifier module 214 identifies that one or more ports have been populated and identifies the shell 114 as a compatible shell based, for example, on a unique identifier provided by the shell 114. In wireless implementations, the shell identifier module 214 may identify the receipt of such indicia from the shell 114 when, for example, the shell 114 associates with the electronic device 102 via near field communication or acquires a quick response (QR) code from the shell 114. Upon receipt of the identifier, the shell identifier module 214 may initiate a download or an update of data downloaded from external sources (such as the data source 204) to update the shell/light source UI customizer 216 based on a recognition of the shell 114.

In some embodiments, shells may be regularly swapped (replaced on the electronic device with another shell). In such instances, the shell identifier module 214 may configure the electronic device 102 to operate in accordance with a profile associated with a particular shell that is attached to the device. For example, a 'work' shell may include lights that indicate contacts and events that relate to work (missed call from office or manager) while a 'home shell' may include lights that indicate updates on friend's activities, and so forth. Each shell may be identified and operate according to programmed or stored information (e.g., via the light controller 212, etc.), which may allow swapping of the shells.

The shell/light UI customizer 216 may utilize information of the shell identifier 214 and/or the light controller 212 to enable a user to customize or configure the activation/deactivation of the lights (or light segments) light source 116. For example, a user may assign particular lights to emit light before, during, or after an event. The particular lights may correspond to partially transparent or translucent portions of the shell 114, and when illuminated, reveal a design on the shell. For example, the user may assign the lights to flash, via the shell/light UI customizer 216 when the electronic device 102 receives an incoming call. In some embodiments, some light source assignments may be preloaded in memory for the user to select while other light assignments may be customized by the user.

In some embodiments, the system 200 may include the touch interface controller 218. The touch interface controller 218 may be used to interact with a touch interface display or panel that may be optionally used with the light source 116 shell 114 to receive user input via touch-input on the shell.

FIG. 2b is a schematic diagram of illustrative architecture 220 of an illustrative light source and an illustrative light router. The light source 116 may emit light that is redirected by the light router 222. Each component is discussed in turn.

In accordance with various embodiments, the light source 116 may include an interface 224 to communicate with the electronic device 102. The interface 224 may enable identification of the light source, and possibly of the shell 114 such as when the light source is integrated with the shell. The interface 224 may also communicate with the electronic device 102 to selectively control operation of the light source 116, or a portion thereof, via the light controller 212. The interface 224 may communicate with the electronic device 102 via a wired or wireless connection. For example, the interface 224 may receive and/or transmit signals with the electronic device 102 using a radio frequency transmissions, optical transmissions, near field communications, mechanical communications (e.g., pin connections, etc.) or any other type of connection to enable an exchange of information (e.g., instructions) between the electronic device and the light source via the interface.

The light source 116 may optionally include various components that include a processor 226, a power source 226, and/or memory 230. The inclusion or exclusion of any of these components may depend on whether the light source is integrated with the electronic device 102 or with the shell 114 or based on other configuration specific details as disclosed herein. When the light source 116 is integrated with the shell 114, the processor 226, the power source 226, and/or the memory 230 may likewise be integrated with the shell.

In some embodiments, the light source 116 may include the processor 226 to selectively control (e.g., activate and/or deactivate, change color, etc.) portions of the light source or individual lights of the light source. For example, the processor 226 may control each light portion of a matrix of lights based on information received from the interface 224. Alternatively, the interface 224 may be controlled by the processor(s) 208 of the electronic device 102 to selectively control the emission of light from the light source 116.

The light source 116 may include the power source 228 which may be a dedicated power source for the light source. In some embodiments, the power source 228 may be implemented as a primary or secondary power source, such as when the light source 116 receives primary power from the power source 206 of the electronic device.

In some embodiments, the light source 116 may include the memory 230 to store data, instructions, modules, and/or components for use by the light source. The memory 230 may include light source logic 232 as data that includes instructions for the processor 226 to interpret and exchange data with the light controller 212 via the interface 224.

In accordance with some embodiments, the light router 222 may be a layer disposed between the light source 116 and the shell 114 and used to route (e.g., direct, defuse, etc.) light emitted from the light source to specific portions of the shell. For example, the light router 222 may redirect a portion of light beams 234 that are emitted from the light source, such that the light beams travel to other portions of the shell that may or may not be proximate to the light source.

The light router 222 may include light pipe(s) 236 (e.g., diffuser, light tubes, etc.) and/or fiber optics 238 to route the emitted light. Light pipe(s) 236 may include molded features 240 (typically plastic) such as prismatic folds that reflect light off of angles to redirect the light emitted by the light source 116. The light pipes (or tubes) may include multiple redirecting features on a single piece, which may then be attached (snapped, etc.) to the shell 114 or over the light source 116 to enable redirection of light.

The fiber optics 238 may be used separately or in combination with the light pipe(s) 236. The fiber optics 238 may include strands 242 that have gentle curving bends to route light from the light source to portions of the shell 114. In some embodiments, the fiber optics 238 may be used to scatter light beams to many areas on the shell to create a distribution of small specks of light.

The light router 222 (via light pipe(s) 236 and/or the fiber optics 238) may enable use of a single light source with multiple different shells. The light router 222 may be configured for specific shells 114 to redirect light to specific parts of the shell based on the particular shell design (e.g., location of stencils, etc.). The light router 222 may enable use of a small and/or centralized light source, such as a light panel that only covers a portion of a surface that is covered by the shell 114. This may provide greater access to components in the electronic device, such as the power supply 206 (e.g., a battery accessible via a battery cover, memory card readers, other ports, etc.). In some embodiments, the light source 116 may be removable or partially removable to enable access to components of the electronic device.

Figure 2C:
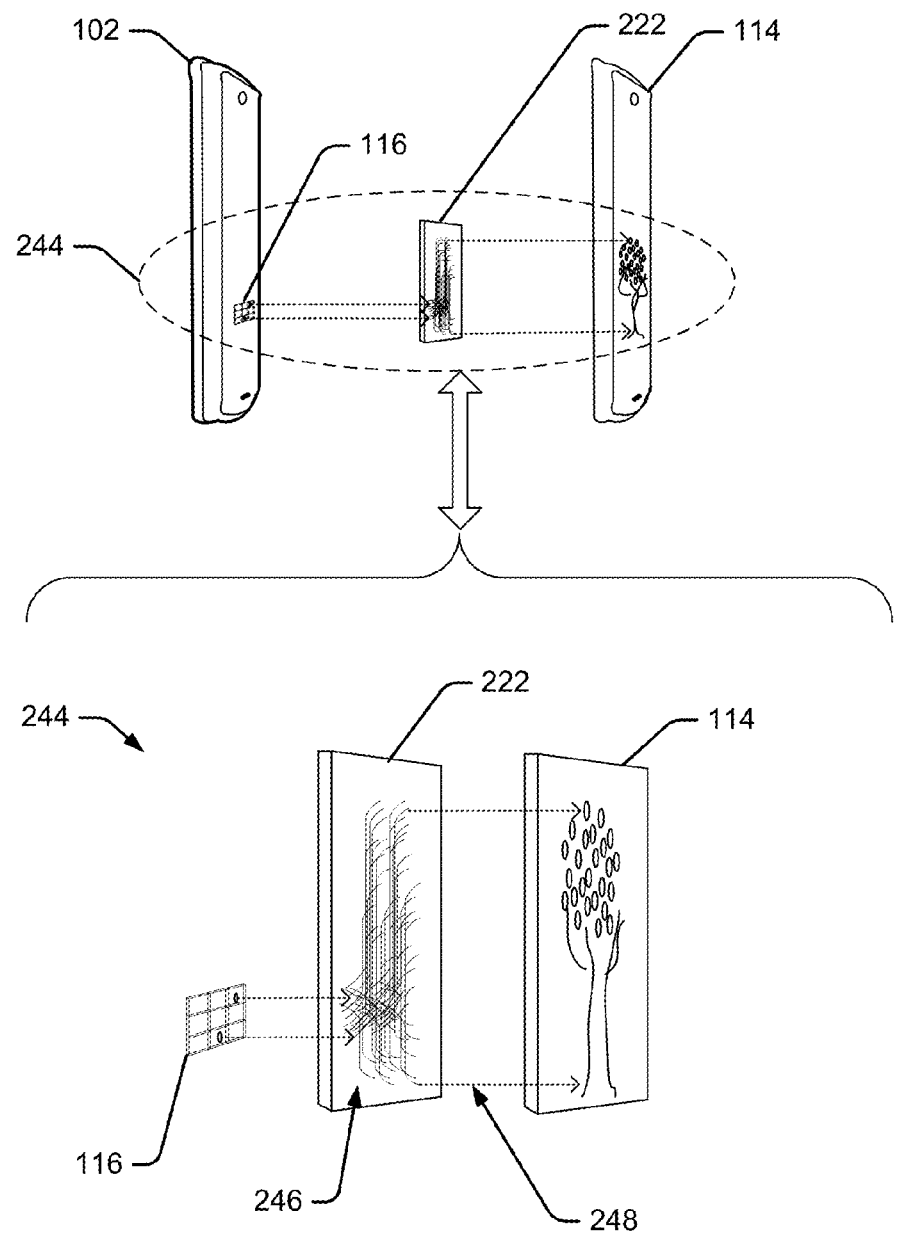

FIG. 2c is a schematic diagram of illustrative architecture 244 of an illustrative light source and an illustrative light router. The light router 222 may be implemented as the light pipes 236 and/or the fiber optics 238. In accordance with various embodiments the light source 116 used with the light router 222 may only cover a relatively small portion of the back of the electronic device 102. The light router 222 may use features 246 (prisms, tubes, etc.) to distribute light 248, and ultimately disperse the light from the light source 116 over a greater surface area and/or surface area of the shell 114 that is not adjacent to the light source 116 (when the shell 114 is coupled to the electronic device 102).

Figure 3A:
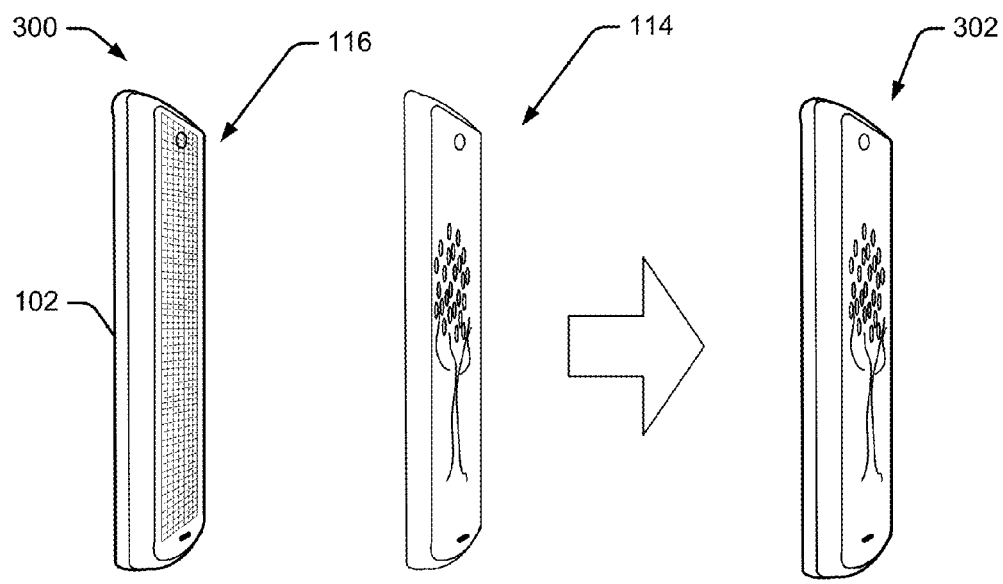
FIG. 3a is an exploded view of the electronic device having the light source integrated with the electronic device and FIG. 3b is an exploded view of the electronic device having the light source detachable from the electronic device.

In one example implementation, light pipes 236 may be used to distribute light from a light source that covers a relatively small area to a larger surface area of the shell by redirecting the light 248. In this way, a single light (e.g., LED, etc.) may emit light which is spread across various areas of the shell 114 to reveal a design (or portion thereof). Another light may light other regions of the shell or may increase an intensity of the light when combined with light emitted from the first light. By using the light router 222 with the light pipes 236 and/or the fiber optics 238, a design of the shell may be selectively lit to reveal increasing amounts of the design. For example, an additional dispersed number of leaves on a tree may be lit upon activation of each of the lights of the light source where the leaves are distributed across the whole design rather than being lit in segments or blocks. FIG. 3a is an exploded view of the electronic device 300 having the light source integrated with the electronic device. For example, the light source 116 may be integrally formed with the electronic device 102. This may enable the power source to be hard-wired in the device (as opposed to plug in) and may reduce a thickness of the device by omitting unnecessary layers of the electronic device (e.g., a back panel). A coupled device 302 includes the shell 114 coupled to the electronic device 300. Light emitted from the light source 116 of the coupled device 302 may be visible via transparent or translucent portions of the shell (e.g., light stencils) and reveal designs and/or messages to a user. In some embodiments, the coupled device 302 may include the light router 222 to route light between the light source 116 and the shell 114.

Figure 3B:
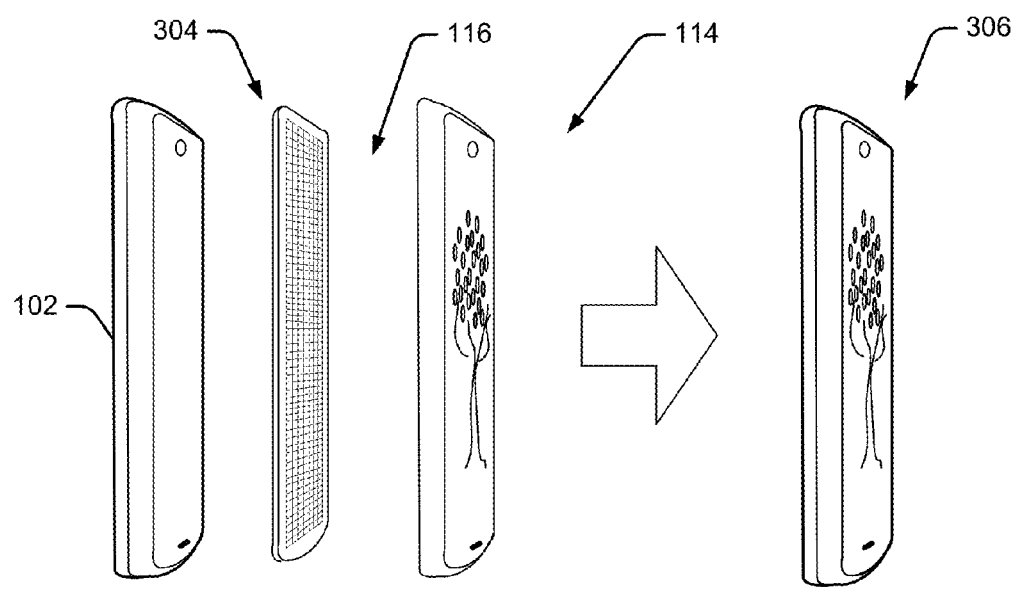

FIG. 3b is an exploded view of the electronic device having a detachable light source 304 that can detach from the electronic device 102. The detachable light source 304 may receive power from the electronic device (e.g., via USB, pin connector, terminals, magnetic induction, etc.) to power the light source. The detachable light source 304 can be easily upgraded or otherwise replaced by removal of the light source. For example, when the detachable light source 304 is limited to display of a single color (e.g., using EL lights), then a user may desire to change the color of the light source by swapping it out with another different colored light source. Light sources with different resolutions (e.g., panel or matrix with more or fewer subdivisions) may also be swapped when the detachable light source 304 is detachable from the electronic device 102. In some embodiments, the detachable light source 304 of FIG. 3b may couple to the shell 114 or be integrally formed with the shell. A coupled device 306 may include the light source 116 coupled between the shell 114 and the electronic device 300. In some embodiments, the coupled device 306 may include the light router 222 disposed between the light source 116 and the shell 114 to route light between the light source and the shell.

The light sources 116/302, whether integrally formed with the electronic device 102, the shell 114, or free standing, may be usable with various shells. For example, users may use different shells that are compatible with a particular light source, such that the transparent or translucent portions (stencils) of the shell align or substantially align with the light sources of the matrix of the light source 116. Another coupled device 306 is created when the shell 114 is coupled to the electronic device 300. The coupled device 306 may appear and function similar to the coupled device 302 despite the difference of configuration of the light source 116.

Illustrative Shell

Figure 4:
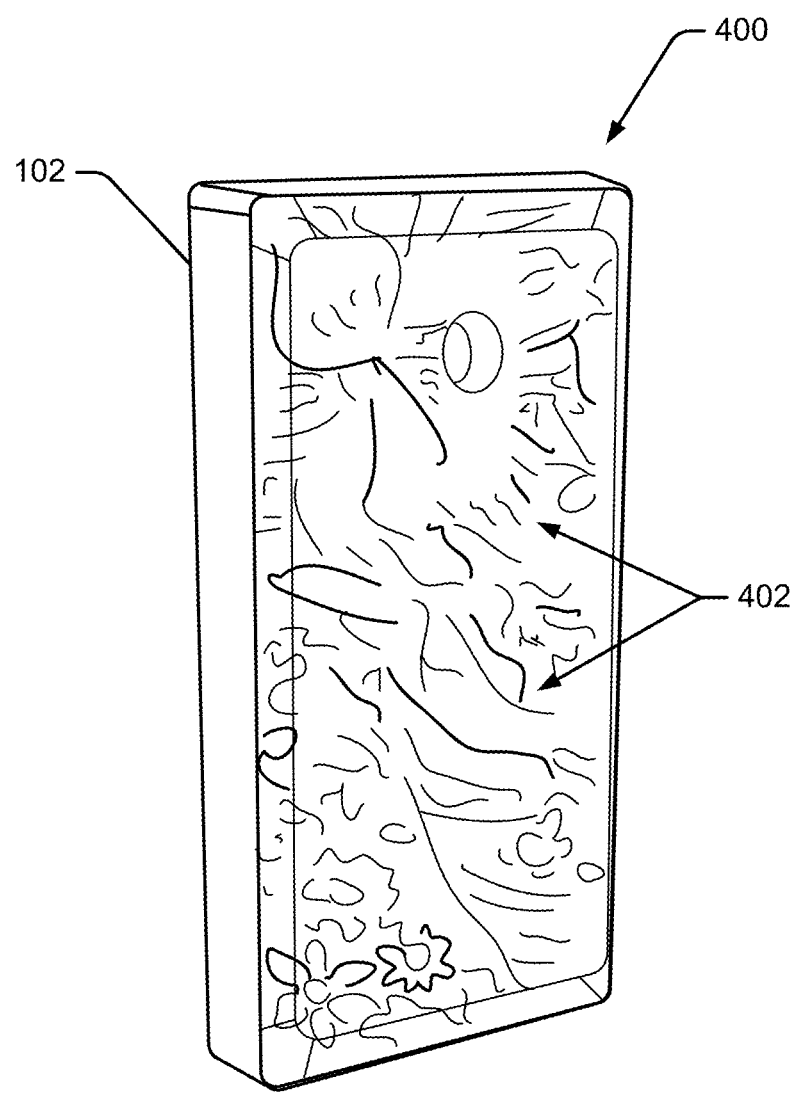
FIG. 4 is an illustrative engraved transparent shell that covers a light source.

FIG. 4 is an illustrative engraved transparent or translucent shell 400 that covers a light source. The engraved shell 400 includes various features 402, which may be engraved in the shell or may included in the light router, such as by prisms in the light pipes 236. The features may redirect light when emitted from the light source 116 located between the engraved shell 400 and the electronic device 102. The features 402 may glow to reveal designs in the shell 400 when light is emitted, but the features may be otherwise not visible when the light source does not emit light. In some embodiments, the features 402 may be engraved on an interior of the shell adjacent to the light source 116 and the exterior of the shell may have a relatively smooth surface. In various embodiments, the features 402 may be part of the light router 222, such as the light pipe(s) 236 that use the features 240 to redirect light as discussed with reference to FIG. 2b, or light pipe(s) or fiber optics as discussed with reference to FIG. 2c. The engraved shell 400 may be formed of a material that is transparent or translucent or otherwise to create a decorative lens when light is emitted through the shell via the light source 116.

Figure 5A:
FIGS. 5a and 5b show an illustrative etchable transparent shell that covers a light source.

FIG. 5a shows an illustrative etchable transparent or translucent shell 500 that covers a light source. In some embodiments, the etchable transparent or translucent shell 500 may be layered (covered) in opaque paint 502, which can be scratched away to create designs 504 (light stencils) that reveal light from the light source 116 located between the electronic device 102 and the shell. The opaque paint 502 may be applied to the interior of the shell (adjacent to the light source) and etched (scratched away) by a user, designer, machine, etc., when the shell is displaced from the electronic device 102. The opaque paint 502 may also (additionally or separately) be applied to the exterior of the shell and similarly be scratched away. In some embodiments, a protective overlay may be applied over the etched surfaces to prevent additional removal of the paint.

Figure 5B:
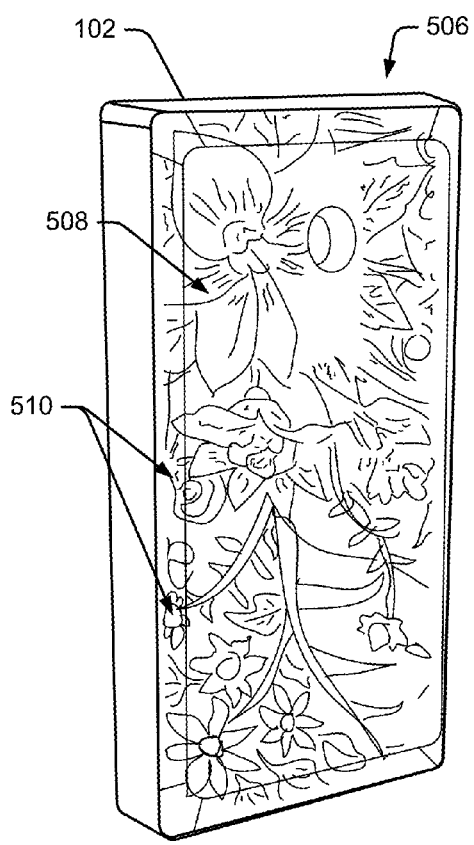

FIG. 5b shows another illustrative etchable transparent or translucent shell 506. The etchable transparent or translucent shell 506 may include a design 508. When lights are colored or a shell is colored (e.g., colored plastic), the design 508 may appear in color when light from the light source 116 passes through etchings 510 and through the shell. In some embodiments, the shell may include differently colored portions to vary the color across the design.

Illustrative Customizable Shells and Light Sources

Figure 6A:
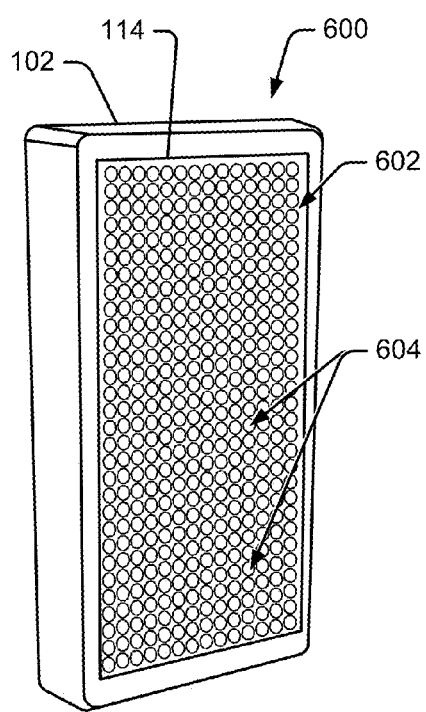
FIG. 6a is an illustrative light source and FIG. 6b is a customized display of the illustrative light source.

FIG. 6a is an illustrative light source 600. The light source 600 may include a matrix 602 of lights 604, which may be arranged in a grid pattern or in a random distribution. The matrix 602 may have a resolution based on a number of lights 604. For example, the light source 600 may include a matrix 602 of almost any number of lights 604 capable of fitting on the light source 116 and as few as one light (e.g., an EL panel, etc.).

The lights 604 may be individual lights (e.g., LEDs, etc.) or light segments (e.g., EL segments, LCD segments, etc.). The lights 604 of the light source 600 may be controllably illuminated by the light controller 212 to create a design, transmit information, or perform other functions. Some of the lights 604 (mono-color) may be dedicated to emitting a single color of light while other of the lights 604 (multi-color) may be capable of changing colors of light that are emitted from the respective light. Mono-color lights, when grouped with other colors, may be configured to appear to change color by lighting different colors (via different lights) at the same time. For example, yellow and green lights used together may appear to emit blue colored light.

Figure 6B:
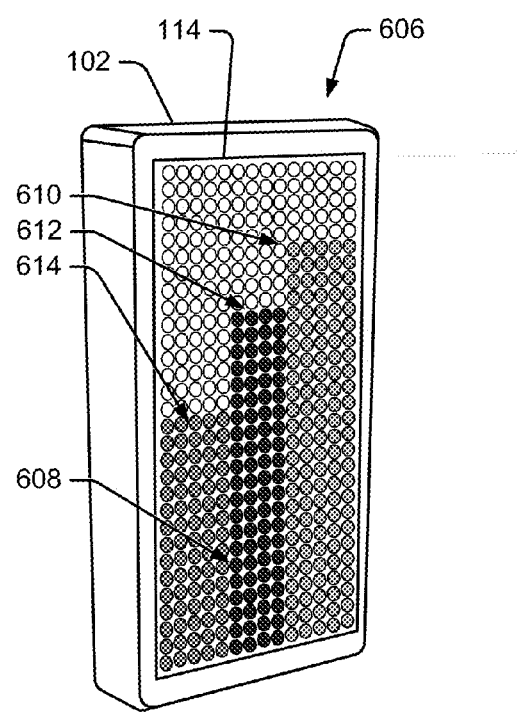

FIG. 6b is a customized display 606 of the illustrative light source 600. The customized display includes an emission of light 608 of the lights 604. The emission of lights may be organized in a particular pattern, such as in columns 610, 612, and 614. Each of the columns may provide information to a user. For example, a user may configure the light source 600, via the UI customizer 216 to assign missed calls to the first column 612, text messages to the second column 614, and so forth. As the number of missed calls increase, an amount of light emitted from lights in the first column 610 may increase, thus revealing information to the user. In this way, the light source 600 may create a dynamic display. More or fewer columns, or other shapes and indicators, may be used to convey information to the user. In some embodiments, some displays may be loaded in memory for the user to select while other displays may be customized by the user.

Figure 7C:
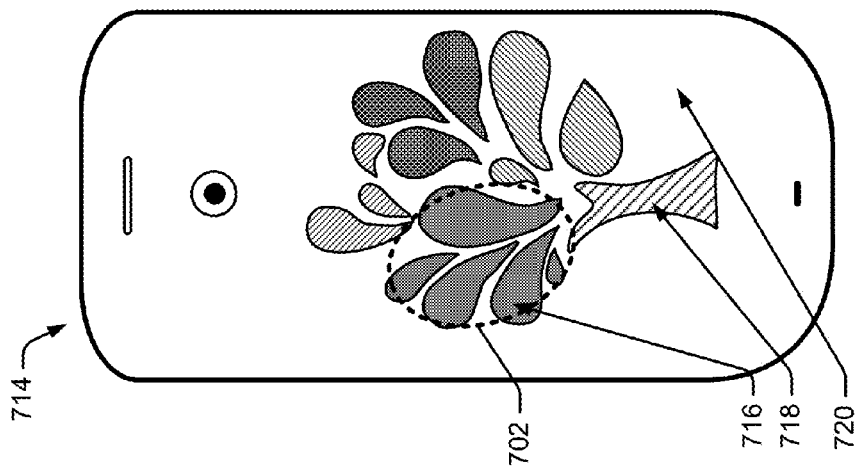
FIG. 7c is an illustrative shell having transparent portions that are customized by the UI.
Figure 7B:
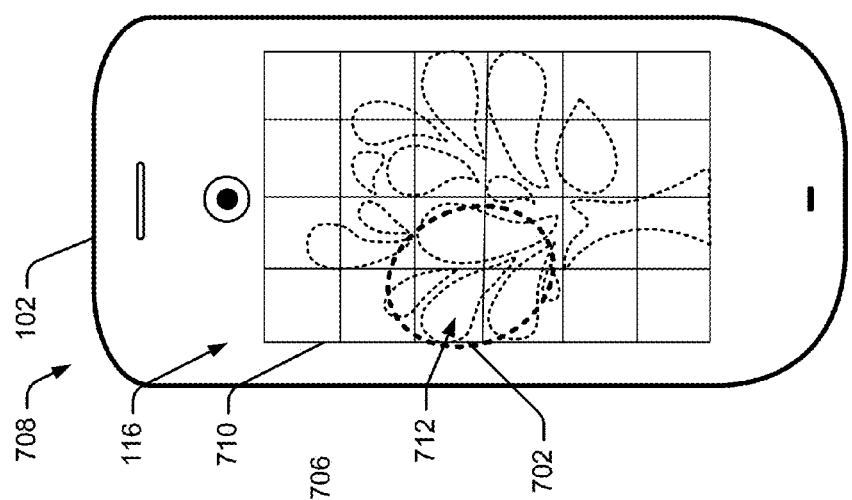
FIG. 7b is an illustrative overlay of a design and the light source that enables illumination of the segment.
Figure 7A:
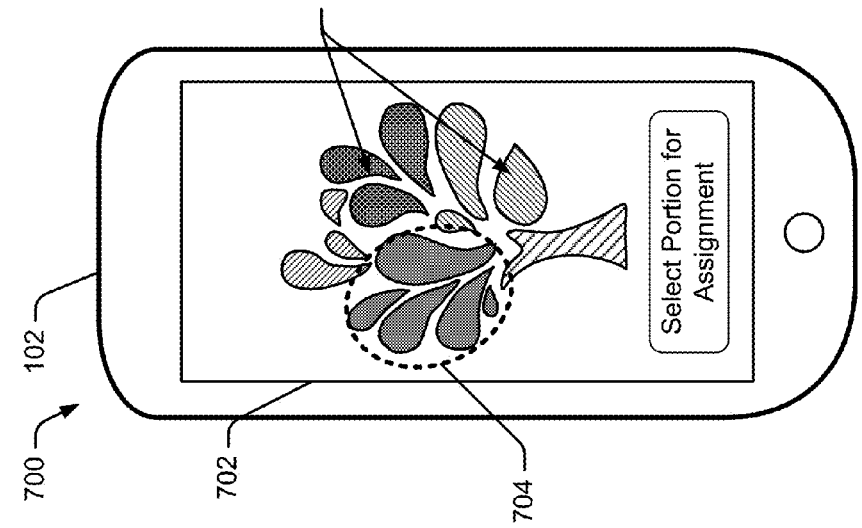
FIG. 7a shows an illustrative light source user interface (UI)

FIG. 7a shows an illustrative shell configuration user interface 700. The electronic device 102 includes a primary display 702, which is typically located on the front side 104 of the electronic device. When the UI customizer 216 is running (loaded in memory), the electronic device 102 may cause the display of a user interface 702 that enables user selection of a shell feature 704. Using the user interface 702, the user may assign the segment 704 to an activity associated with an element (e.g., missed call from Jenny, etc.), which may instruct the light controller 212 to initiate the emission of light to a corresponding portion of the shell and thereby revealing light to the corresponding portion of the shell feature. The user interface 702 may include other segments 706, which may be user defined or predetermined by the user interface 702.

FIG. 7b is an illustrative overlay 708 of a shell design and a light source 116 that enables illumination of the segment 704. The light source 116 may include a matrix 710 that is a subdivision of lights of the light source. A portion of the lights 712 (i.e., portion of the matrix 710) may correspond to the segment 702, such that upon activity of an element (e.g., trigger) then the portion of the lights 712 may be illuminated to light a corresponding portion of a design on the shell. In some embodiments, a light router 222 of FIG. 2 may direct light from the portion of the lights 712 to the corresponding portion of the design on the shell. Specifically, when the portion of the design on the shell is smaller than the portion of the lights, or dispersed over an area, than the light router 222 may enable such emission of light to the shell to enable customization of the light source. The UI may include an image 708 representative of a shell that is attached to the electronic device 102 and identified via the shell identifier 214. The image 708 may represent a design of the shell. As shown in the UI 706, the image looks like a tree, where the shell includes a similar design of a tree that illuminates based on light emitted from various portions of the light matrix. Using the UI, the user may assign tasks, messages, or other data to areas of the light matrix based on the UI. For example, the user may select the upper left region of the image 706. Next, the user may assign (associate) a task, message, or other data to the selected region (e.g., new text message). Upon assignment, when the task occurs in the future (e.g., a new text message is received); the respective portion of the light matrix may illuminate and cause the upper left of the shell to glow, thus providing an indication to the user.

FIG. 7c is an illustrative shell 714 having transparent or translucent portions that correspond to the segments 704 and 706 of FIG. 7a and that are customized by the user interface 702. As discussed above, the customized shell 714 may have a design that is represented on the user interface 702, which may enable the user to assign and/or associate data with different portions of the design via the UI customizer 214. In some embodiments, a first portion 716 of the shell that corresponds to the segment 702 may be formed of a first colored shell feature, a second portion 718 may be formed of a second colored shell feature, and so forth to create a stained-glass like shell design, which may have the portions selectably illuminated based on the activation/deactivation of lights of the light source 116 and may be distributed via the light router (light pipes 236, etc.). Other portions of the shell may not be transparent or translucent, such as a portion 720. In various embodiments, the shell 114 may be a transparent or translucent material without stencils and the design may be revealed by an emission of lights, such as shown in FIGS. 6a and 6b, which may be controlled by user input via the user interface 702.

The user interface 702 of FIG. 7a may also be used to assign light that is directed by the light router 222 (i.e., the light pipes 236 and/or the fiber optics 238). For example, the user may select a portion of the design that the user desires to illuminate via the user interface 702. For example, the user may select leaves of a tree design that are dispersed across the design. The user may then designate an amount of leaves (or other features) to be illuminated by the light source, which may use light redirected by the light router 222, which may have a user-associated meaning. For example, more illuminated leaves may indicate more occurrences of an event (e.g., missed calls, awaiting messages, etc.). By using the light router 222, the light may be dispersed across all the leaves so the tree appears to transition from a relatively bare tree (few or no visible leaves) to a tree flourishing with leaves when many of one or more associated events have occurred, all by way of the light pipes 236 and/or the fiber optics 238.

The various data conveyed via the customized shell 714 may be any relevant data for a particular electronic device. For example, when the electronic device 102 is a telecommunications device, the data may include information about email, calendars (e.g. meeting notification, etc.), voicemail, missed calls, social information (e.g. wall notification, status updates, etc.), weather, battery life, and so forth. When the electronic device is a personal computer, the data may include a battery indicator, a clock, an artistic design, information about messages (e.g., emails, etc.), and so forth.

Figure 8:
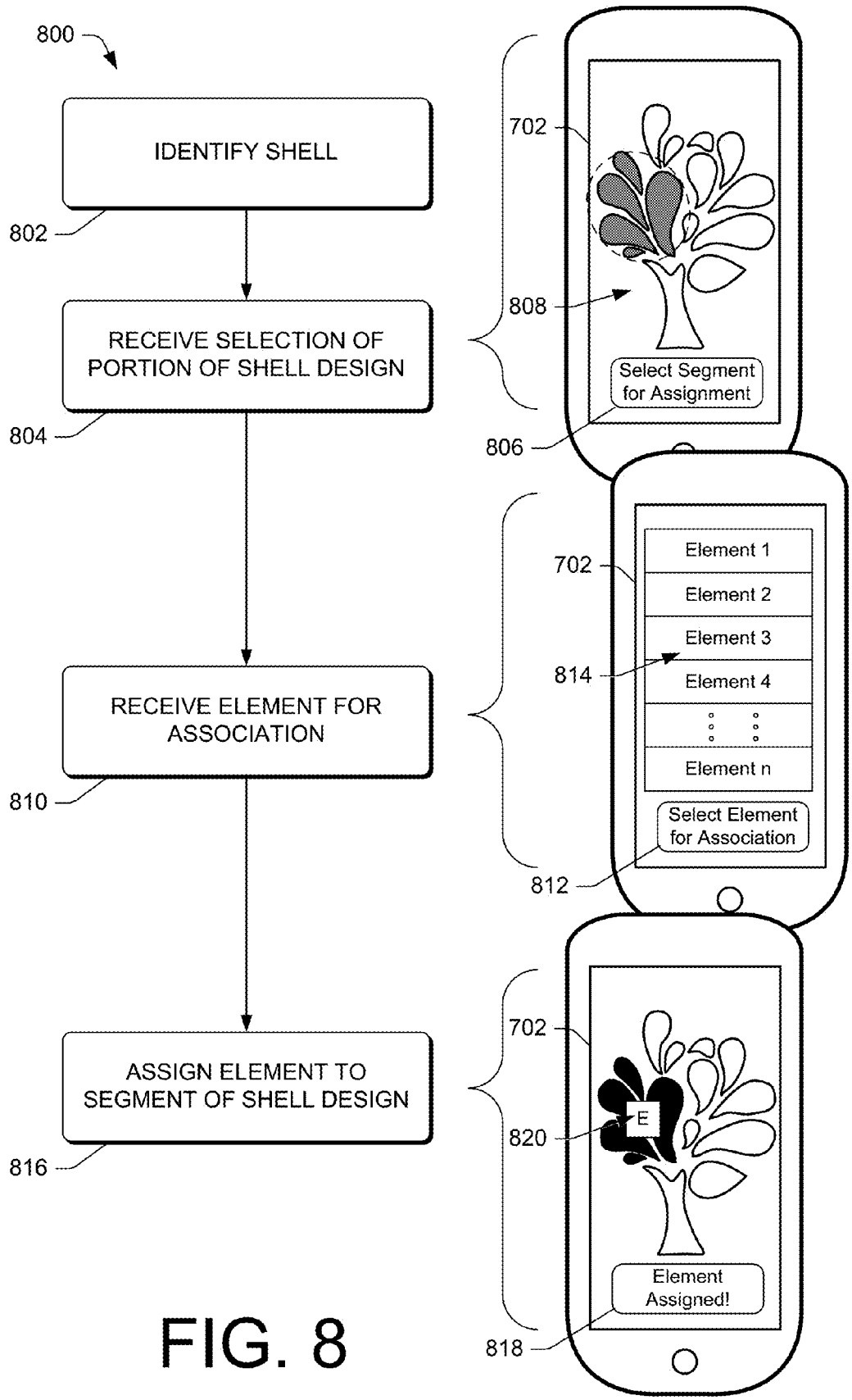
FIG. 8 is a pictorial flow diagram of an illustrative process of customizing the light source via the UI.

FIG. 8 is a pictorial flow diagram of an illustrative process 800 of customizing the light source via the user interface. The process 800 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 800, shall be interpreted accordingly.

At 802, the shell identifier 214 may identify the shell 114. For example, a user may enter a unique identification number into the electronic device. In another example, the electronic device may recognize the shell based on data received via the shell (RFID, USB, etc.). Upon identification of the shell, the UI customizer 216 may load information specific to the shell, such as an image that represents a design of the shell. When the particular shell has been used before, the shell identifier 214 may load information related to the assignment to enable use of the shell.

At 804, the UI customizer 216 may receive a selection of a portion of the shell design via the image in the user interface. For example, a user may touch (or otherwise select) a portion of the image (e.g., upper left hand corner, center portion, etc.) on the primary display. The selection may be made using other inputs and may vary based on the type of light source used with the shell (e.g., resolution of matrix, etc.). For example, the user interface 702 may show a first message 806 such as "select segment for assignment" and include an image 808 that corresponds to a design of the shell 114.

At 810, the UI customizer 216 may receive a selection of an element to be associated with the segment corresponding to the portion of the shell design. For example, the user interface 702 may show a second message 812 such as "select element for association" and include a list of elements 814, such as data (alerts, items, etc.), contacts, or other data (or combination thereof) that may be associated with the portion of the shell design. For example, the user may assign a segment of the light source (e.g., panel) and shell to illuminate when a contact group member sends a text message to the user. Other assignments may include more detail (message from a specific contact) or less detail (a text message from any person) and may be for the same or different events (email, missed call, etc.).

In some embodiments, the operation at 810 may include multiple menus. The operation 810 may include a first selection of a category of elements, showing a list of elements based at least in part on the first selection, and receiving a second selection to identify the element from the list of elements. Other menus are contemplated that enable association of elements with information about email, calendars (e.g. meeting notification, etc.), voicemail, missed calls, social information (e.g. wall notification, status updates, etc.), weather, battery life, and so forth.

At 816, the UI customizer 216 may assign (or map) the element to the segment that corresponds to the portion of the shell design. For example, the user interface 702 may show a third message 818 such as "element assigned!" and include an icon 818 or other indicator to shown an assignment of the segment and the element. The assignment (or mapping) may be stored in the memory 210 and/or the memory 230. After an assignment (or mapping), activity associated with the element (e.g., receipt of an unread text message, activity related to Sam, combination of both (text message from Sam), etc.) may cause an illumination of a respective portion of the shell, which may remain illuminated until the text message is read, until passage of a predetermined amount to time, or until another event.

FIGS. 9a, 9b, and 9c show messaging by illustrative shell via views 900, 902, and 904, respectively, having segmented portions. The shell 114 may be configured via the process 800 to display information upon occurrence of events. FIG. 9a shows a view 900 of the shell 114 when no lights are illuminated. FIG. 9b shows a view 904 of images 906 (e.g., fish), which are made visible upon occurrence of one or more events and made visible by light emitted from a respective portion of the light source 116. For example, the two fish in the view 904 of FIG. 9b may represent that the user has two messages waiting to be viewed/heard on the electronic device 102. FIG. 9c shows a view 904 of additional images 908 (e.g., fish) which may represent additional information or a larger quantity of a particular item or information. For example some fish may be a particular color (e.g., orange) and may indicate one type of data while other fish may be other colors (blue, green, etc.) and represent other information. In some embodiments, each fish may represent a particular item. Although FIGS. 9a-9c show fish, other types of designs, or images that may be displayed on the shell by emission of light from the light source 116.

FIGS. 9d and 9e show messaging by another illustrative shell via views 910 and 912, respectively. In FIG. 9d, the shell 114 includes an indicator 914 and a design portion 916. In some embodiments, the indicator 914 may indicate an element while the design portion 916 indicates an attribute (e.g., quantity, time period, etc.) of the event, such as by varying degrees of illumination of the design. As shown in FIG. 9e by the view 912, additional indicators 918 may be illuminated upon occurrence of activities associated with various elements. The design portion 920 includes a different level of illumination (compared to the design portion 916 shown in the view 910) to show attributes of the elements. For example, the design portion 920 may have various shapes or portions that are associated with the indicator 918, such as by color or icons, which may show attributes of specific elements denoted by the indicators 918.

In some embodiments, the various assignments of activities that trigger illumination of light may be pre-assigned or automatically configured for a user. In this way, the user may not have to manually assign events and/or activities for use with the light panel 116 and the shell 116. In such implementations, the electronic device may begin operating the light panel 116 upon attachment of the shell 114 without user configuration via the UI as described with reference to FIG. 8.

Figure 10A:
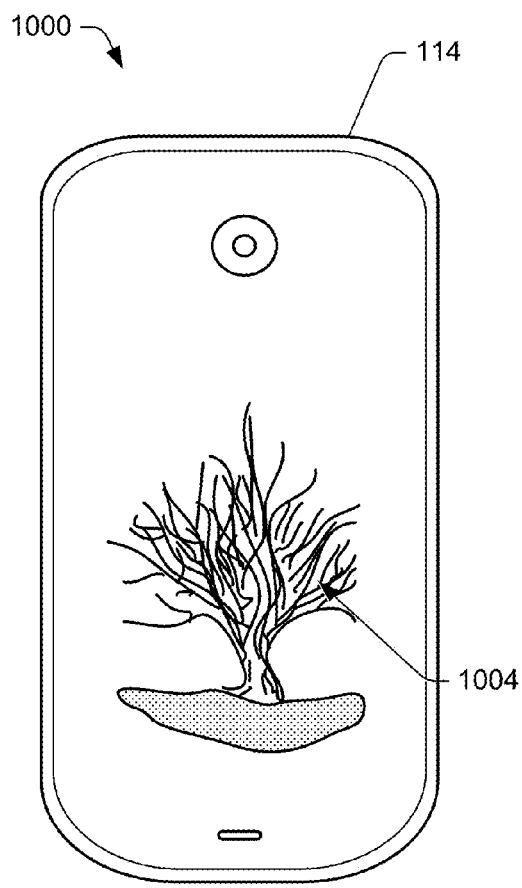
FIGS. 10a and 10b show messaging by a shell having illustrative segmented transparent portions that cover a light source using a light router.
Figure 10B:
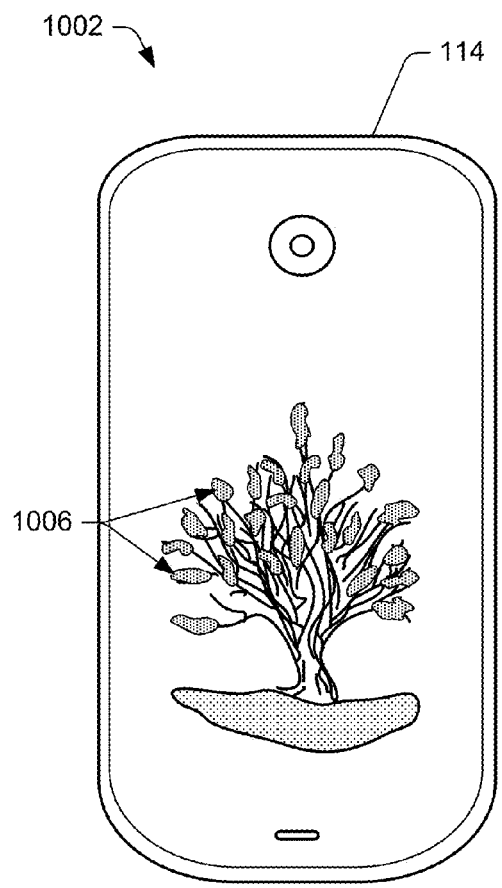

FIGS. 10a and 10b show messaging by another shell via views 1000 and 1002, respectively, having illustrative segmented portions. The illumination shown in views 1000 and 1002 may be created by using the light router 222, such as by redirection of small segments of light from the light source 116 via the fiber optics 236 shown in FIG. 2b, or by light piping or fiber optics as shown in FIG. 2c.

The shell 114 may include a first illuminated portion 1004). When information is received, such as unheard messages, a second illuminated portion 1006 (another part of a stencil) may be made visible. The second illuminated portion 1006 may increase (or decrease) in size, color, brightness, etc. based on a quantity or other characteristic of the information. For example, when many messages are awaiting the user, a tree may appear to have a lot of leaves. Each subset of leaves may be illuminated by the fiber optics 238. However, when few messages are present, few leaves (fiber optics) may be illuminated on the tree design. Changes in the tree may be rendered by emitting more or less light from a matrix of the light source 116. The light piping 236 may be used to achieve similar results.

Figure 11:
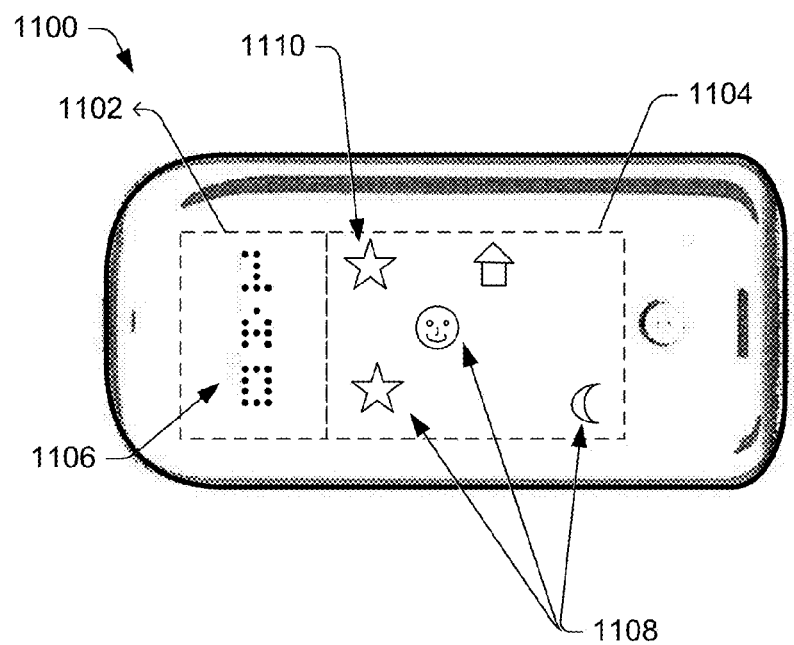
FIG. 11 shows messaging by another shell having illustrative segmented transparent portions that cover a light source.

FIG. 11 shows messaging by yet another shell 1100 having illustrative segmented portions. The shell 1100 may include a first portion 1102 and a second portion 1104, which may be aligned as a grid. In some embodiments, the grid of the shell 1100 may align with a matrix grid of the light source 116 located under the shell. The first portion 1102 may include identifiers 1106. The identifiers may be customized (via the UI), such as by a high resolution of selectable lights in the light source 116 proximate the first portion 1102. In some embodiments, the identifiers may be permanent tags in the shell (etched, written, graphics, etc.). The second portion 1104 may include icons 1108 (imagery, shapes, characters, etc.) to display information when illuminated by the light source 116.

In some embodiments, a grid of icons may be included in the second portion 1104, which may have repetitive rows (or columns) of the same icons for each row (or column). Respective icons may be light stencils that are individually illuminated upon occurrence of a triggering activity associated with an element. For example, when a triggering activity occurs, such as when the user receives an email from a friend "Rita," then a first icon 1110 may become illuminated (via activation of a respective portion of the light source 116) to reveal the icon and thus the data associated a corresponding indicator. Other icons may represent other information (currently calling, missed call, text message, etc.). Other arrangements of the grid and the first portion 1102 and second portion 1104 are contemplated for the shell 1100. By using a grid, a simple LED or EL based light source may transmit a host of information. A LCD portion may enable customizing the indicators 1106 (e.g., tags, names, or other data) in the first portion 1102.

Figure 12:
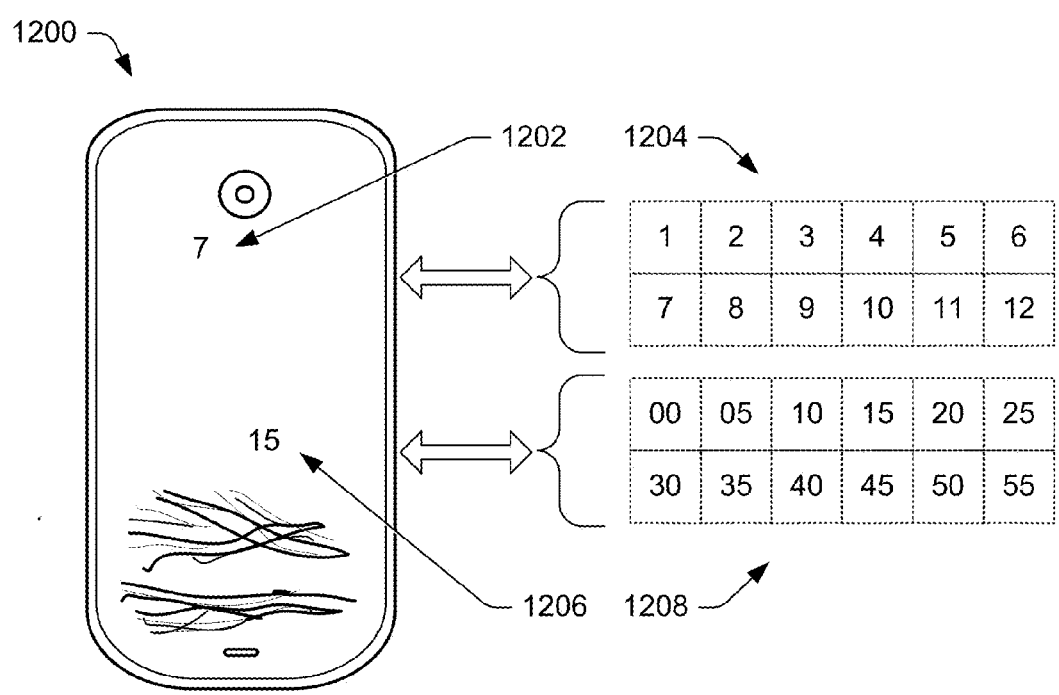
FIG. 12 shows messaging by yet another shell having illustrative segmented transparent portions that cover a light source.

FIG. 12 shows messaging by another illustrative shell 1200 having segmented portions. The shell 1200 may have hidden designs, that when illuminated, provide useful information to a user. For example, a first portion 1202 may include a design consisting of an icon from a first array design 1204 of icons, which are included in the shell but not necessarily illuminated. Similarly, a second portion 1206 may reveal an icon from a second design array 1208 of icons. The first and second portions 1202, 1206 may be used in combination, such as to provide a time of day, a calendar, or other information when specific portions of the design arrays 1204, 1208 are illuminated.

Figure 13:
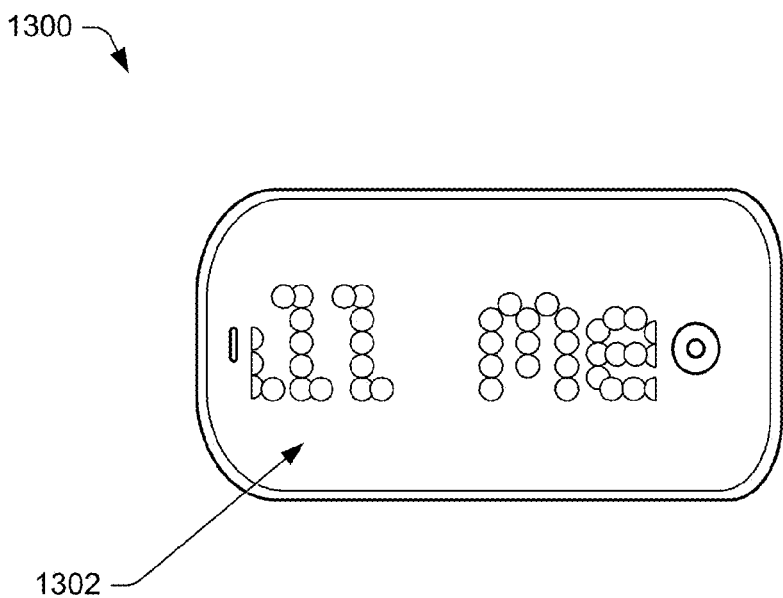
FIG. 13 shows messaging by another shell having illustrative segmented transparent portions that cover a light source.

FIG. 13 shows messaging by still another shell 1300 having illustrative segmented transparent or translucent portions that cover a light source. The shell 1300 may provide a message 1302 by emitting respective lights of the light source 116. In some embodiments, the message 1302 may be dynamic and change depending on the lights that are illuminated. In various embodiments, the message 1302 may be a moving or scrolling message to provide messages, such as calling information, sports scores, a personalized message, etc.

Illustrative Theme Shell with Bonus Data

Figure 14:
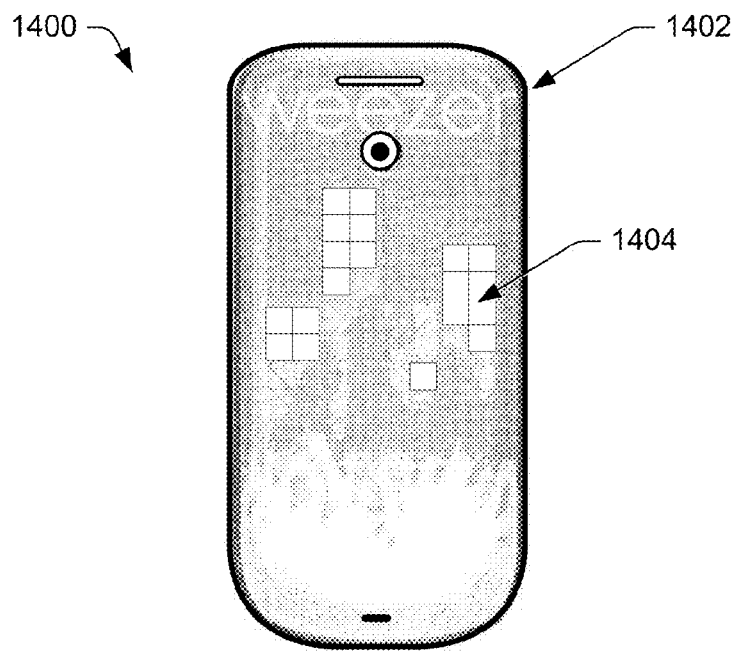
FIG. 14 shows messaging by an illustrative theme shell having segmented transparent portions that cover a light source.

FIG. 14 shows messaging by an illustrative theme shell 1400 having segmented portions. The theme shell 1400 may include a theme 1402, which may be displayed on the shell only when illuminated or by conventional display (always visible marking on the shell). The shell 1400 may include a body design 1404 including various aspects in accordance with the theme 1402. For example, the body design 1404, when illuminated by the light source 116, may display a music visualizer and/or other designs, which may be associated with a band theme, etc. The music visualizer may be synched with a music playing application run by the electronic device 102. In addition, the theme shell may include access to various other data in accordance with the theme 1402, such as ringtones, wallpaper, media downloads, special messages (text from band, etc.), and other bonus data. For example, attachment of the shell to the electronic device 102 may unlock or otherwise make extra content (bonus data) available for use on or by the electronic device 102. In this way, users may purchase the theme shell 1400 to have access to special bonus data in addition to the themed shell.

Figures 15A, 15B:
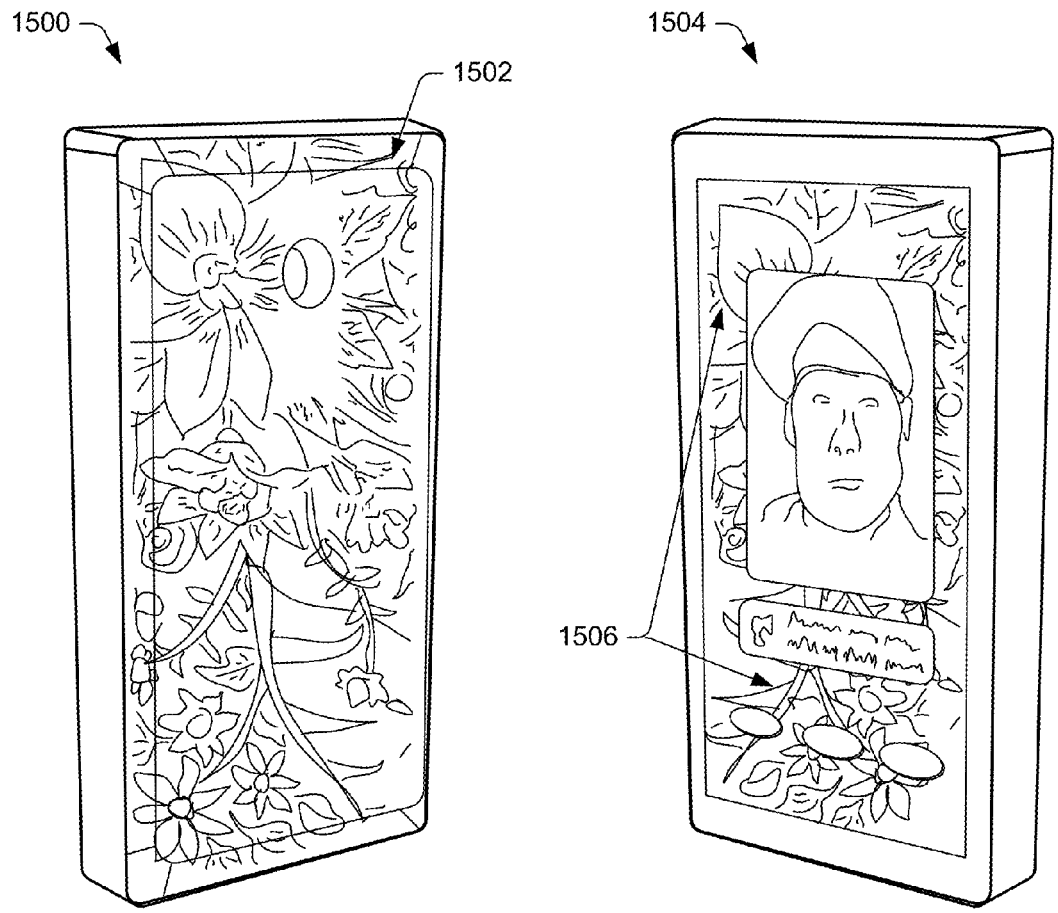
FIGS. 15a and 15b show a theme shell that covers a light source and coordinating data based on the theme shell.

FIG. 15*a* shows a theme shell 1500 that covers a light source and coordinates data based on the theme shell. The theme shell 1500 may have a design 1502 that may be illuminated by the light source 116. FIG. 15*b* shows bonus data 1504 that may be downloaded upon identification of the theme shell 1500. The bonus data may include wallpaper 1506 that coordinates with the design of the theme shell 1500, or other data such as ringtones, etc. Thus, using the theme shell 1500, a user can coordinate multiple aspects of the electronic device 1500 and the theme shell, when coupled to the electronic device. In some embodiments, the shell 114 may be configured (i.e., illuminated) based on a theme used by the electronic device 102. For example, a change in a background image used by the electronic device 102 may result in a change in the illumination of the shell 114 to coordinate the shell with the theme.

Figure 16:
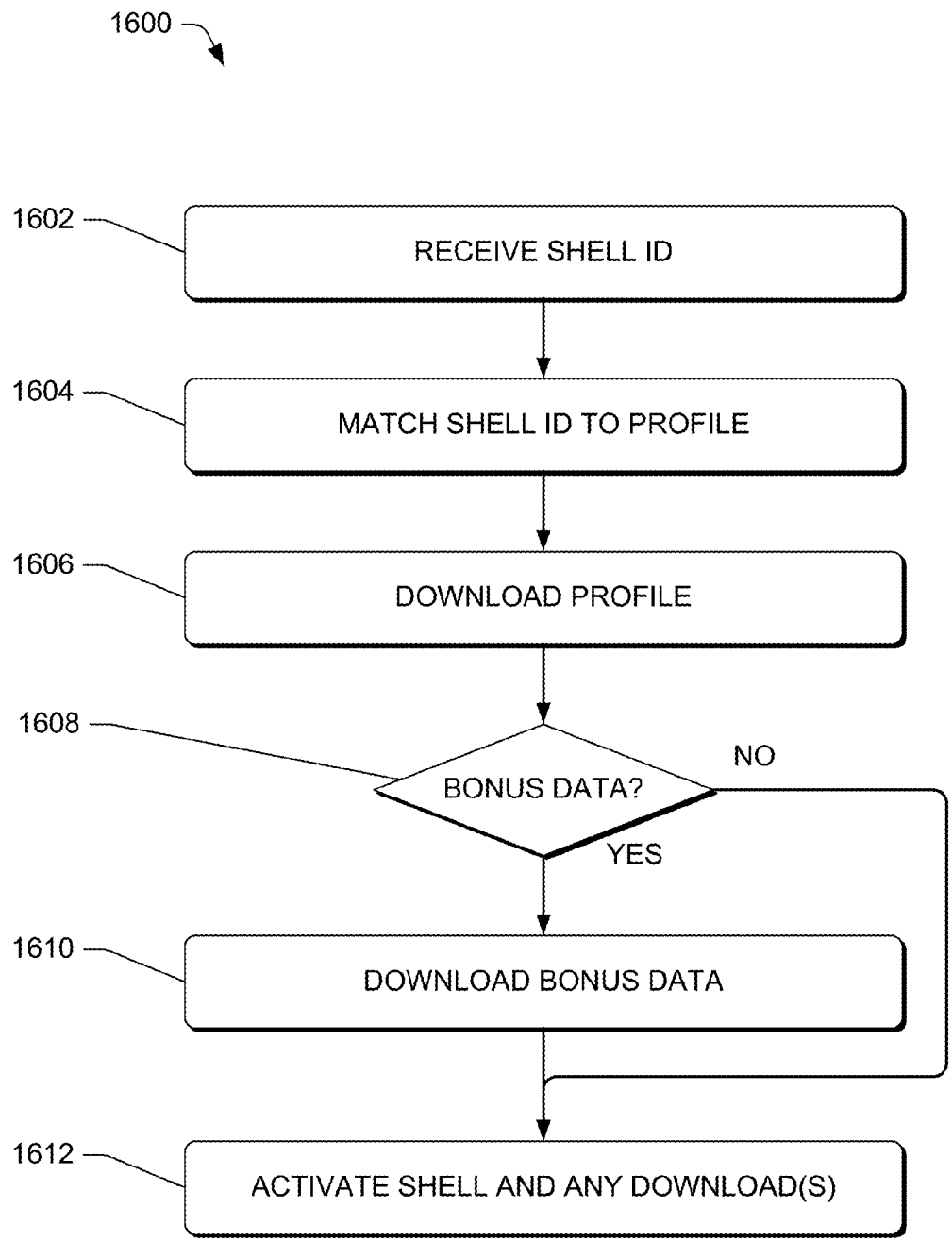
FIG. 16 is a flow diagram of an illustrative process to recognize a shell and download data for the respective shell.

FIG. 16 is a flow diagram of an illustrative process 1600 to recognize a shell and download data for the respective shell. The order in which the operations are described is not intended to be construed as a limitation, and any number of the described blocks can be combined in any order and/or in parallel to implement the process 1600.

At 1602, the shell identifier 214 may identify the shell via a shell ID. At 1604, the shell identifier 214 may match the shell ID to a profile of the shell. The profile may include information to enable the customization of the shell with a respective light source as discussed above with reference to FIGS. 6-13. For example, the profile may be used by the UI customizer 216 to enable the user to designate portions of a shell's design to communicate, when illuminated, various messages to the user.

At 1606, the profile is downloaded or otherwise made available for use by the electronic device. For example, the electronic device 102 may download the profile from the data source 202 via the network 204. In some embodiments, the profile may become unavailable upon removal of the shell, such as when the shell transmits a signal to the electronic device, or attachment of the shell 114 is otherwise detectable by the electronic device 102.

At 1608, the shell identifier 214 may determine whether bonus data (e.g., artwork, backgrounds, ringtones, group membership, etc.) is available for the shell (such as the themed shell 1500). When bonus data is available at 1610 ("yes" route), it may be downloaded at 1610 or otherwise made for use by the electronic device having the shell attached. For example, the bonus data may be downloaded from the data source 202 via the network 204. In some embodiments, the user may be registered in relation to ownership of the shell, thus enabling ability for the user to receive messages (text messages, emails, etc.) based on the ownership of the shell.

At 1612, the shell identifier 214 may activate the shell 114 and any downloads or activate permissions to enable access to bonus data, if available. When no bonus data is available at 1608 ("no" route), then the process 1600 may proceed to the operation 1612 and activate the shell.

Illustrative Shell with Touch Interface

FIG. 17 is an exploded view of the electronic device with shell 1700, having the shell that covers a touch interface panel and a light source. The exploded view may include the electronic device 102, the light source 116, a touch interface (panel) 1702, and the shell 114. The touch interface 1702 may enable a user to provide input by touching the shell 114, and in turn activating the touch interface 1702 to transmit data (selection, data input, etc.) to the electronic device. For example, the user may control light emitted by the light source 116 by providing touch inputs via the touch interface 1702 to activate/deactivate light or change colors of lights. The touch interface controller 218 may control operation and receive data from the touch interface 1702. In some embodiments, the touch interface 1702 may be integrally formed with the shell. In some embodiments, touch sensitive light sources may be used (e.g., touch sensitive LED's) which have a touch interface integrated with the light source.

Figure 18:
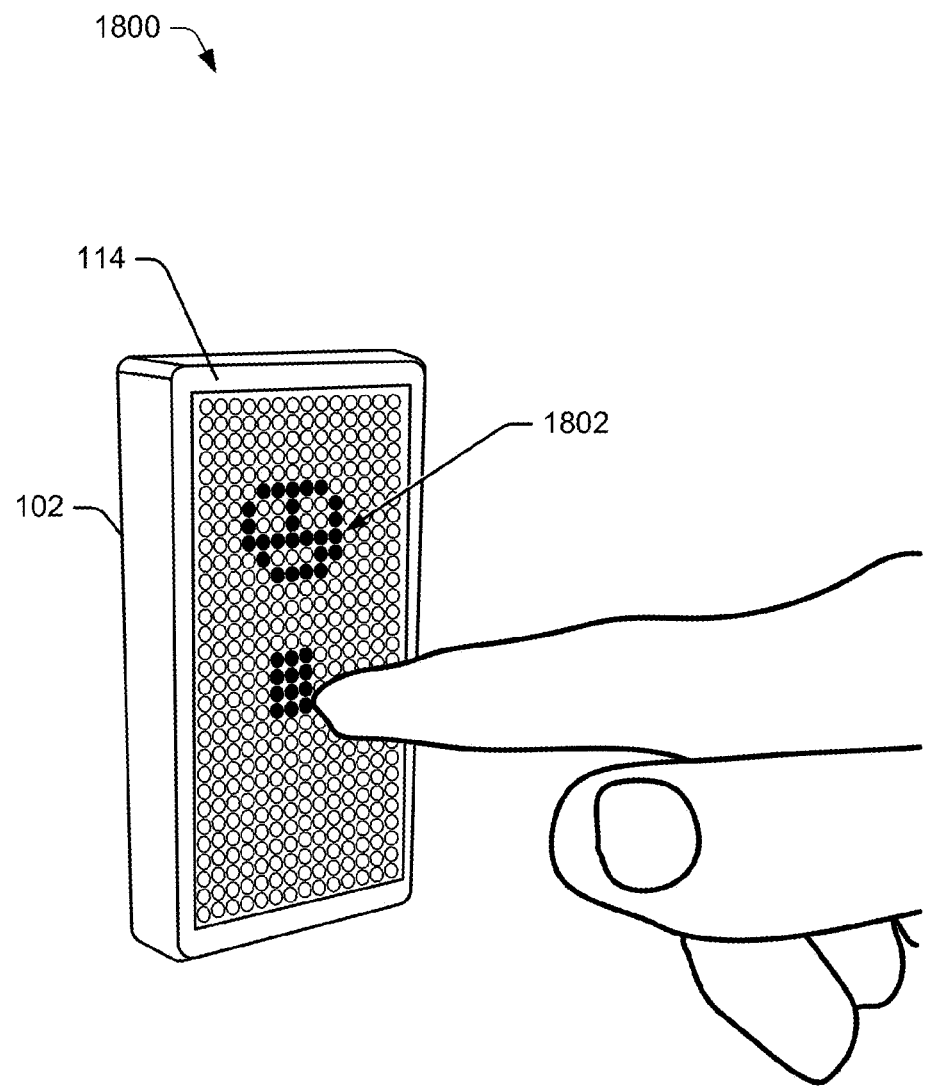
FIG. 18 is an illustrative touch enabled shell having a touch panel to enable interaction with the light source.

FIG. 18 is an illustrative touch enabled shell 1800 having a touch panel to enable interaction with the light source. The touch enabled shell 1800 may enable the user to create a design 1802 via the touch interface 1702. The user may draw or otherwise provide input to the electronic device, such as to control the light source 116 by activating/deactivating lights and/or changing color of lights (when enabled by the light source 116). For example, a LED matrix may be integrated with the touch interface 1702 to allow a user to create an image by touching parts of the shell to turn lights on, and can change color of lights by moving finger in a predetermined motion.

Figure 19:
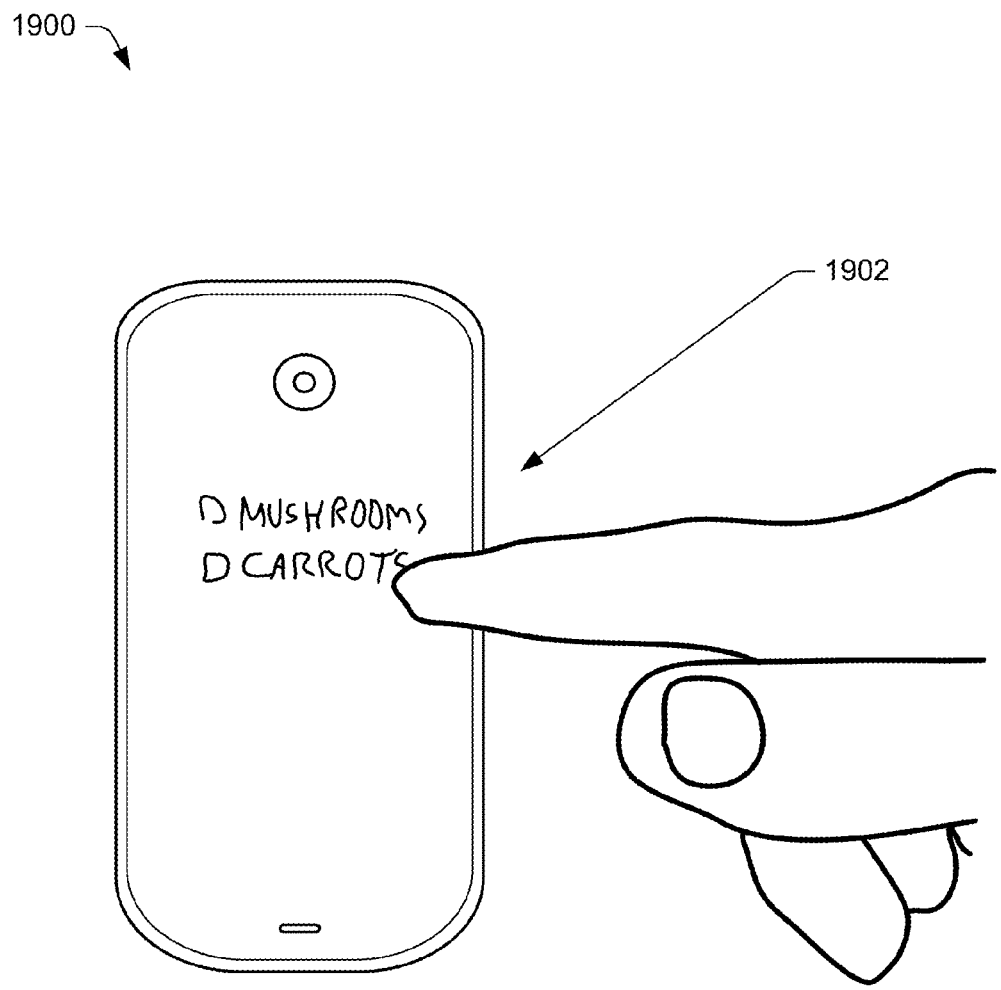
FIG. 19 is another illustrative touch enabled shell having a touch panel to enable interaction with the light source.

FIG. 19 is another illustrative touch enabled shell 1900 having a touch panel to enable interaction with the light source. The touch enabled shell 1900 may enable a user to activate lights on the light source 116 (such as a high resolution light panel), to create a message 1902.

Using the touch enabled shell 1800 and/or 1900, the shell may enable the user to play games (e.g., sinking ship game, simple matrix games, etc.), make simple messages (e.g., to-do lists, notes, etc.), and draw objects or designs. When the user wants clear a portion or all of the shell, the user may deactivate lights by issuing commands to the touch interface, the UI customizer 216, or other commands (e.g., shake the device to erase, etc.).

CONCLUSION

Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A system comprising: a telecommunications device comprising: a transceiver to communicate wirelessly with at least one other device; one or more processors to control at least the transceiver; and a body to house at least the transceiver and the one or more processors; and an illuminated shell, detachable from the telecommunications device, the illuminated shell comprising: a light panel to cause selective illumination of lights based on signals from the telecommunications device, the light panel configured for placement proximate to a side of the body of the telecommunications device; and a shell configured to couple to the body, the shell to at least partially cover the light panel such that light, when emitted by the light panel, passes through at least a portion of the shell, wherein the shell includes a plurality of portions that are independently made visible to a user when a corresponding portion of the lights is illuminated, an amount or a location of the portions that are illuminated indicating at least a quantity of messages available via the telecommunications device.

2. The system as recited in claim 1, wherein the signals are associated with messages received from the at least one other device.

3. The system as recited in claim 2, wherein receipt of a first type of the messages cause the light panel to illuminate a first portion of the lights and receipt of a second, different type of the messages cause the light panel to illuminate a second, different portion of the lights.

4. The system as recited in claim 3, wherein the light panel is configured to assign the first portion of the lights and the second portion of the lights based at least in part on received user input.

5. The system as recited in claim 1, wherein various combinations of the plurality of portions create an artistic representation when illuminated by the corresponding portion of the lights.

6. The system as recited in claim 1, wherein the messages include at least messages directed to the telecommunications device and messages directed to a social network associated with the user.

7. The system as recited in claim 1, wherein the illuminated shell further comprises a light controller to direct the light panel to emit light based on the signals from the one or more processors of the telecommunications device.

8. The system as recited in claim 7, wherein light controller is configured to implement user assignment of a first portion of the lights for association with a first type of message and a second portion of the lights for association with a second type of message.

9. The system as recited in claim 7, wherein the lights are configured to emit light to illuminate different amounts of corresponding areas of the shell based at least in part on the signals.

10. An apparatus comprising: a light panel to receive signals from a telecommunications device and emit light outwards in different directions in response to at least some of the signals and in accordance with a user-customizable mapping of the signals to the different directions: and a shell couple to a body of the telecommunication device, the shell having at least one portion that allows light to pass through the shell from the light panel located between the shell and the telecommunications device, wherein the shell includes a plurality of portions that are independently made visible to a user when a corresponding portion of lights is illuminated, an amount or a location of the portions that are illuminated indicating at least a quantity of messages available via the telecommunications device.

11. The apparatus as recited in claim 10, wherein the signals correspond to messages available via the telecommunication device.

12. The apparatus as recited in claim 11, wherein receipt of a first type of the messages cause the light panel to illuminate a first portion of lights and receipt of a second, different type of the messages cause the light panel to illuminate a second, different portion of the lights.

13. The apparatus as recited in claim 10, wherein various combinations of the plurality of interconnected portions create an artistic representation when illuminated by corresponding light segments of the light panel.

14. The apparatus as recited in claim 10, wherein the messages include at least messages directed to the telecommunications device and messages directed to a social network associated with the user.

15. An apparatus, comprising: a light source configured to selectively direct emission of light to different areas proximate to the light source, the light source to receive signals from a processor of a telecommunications device and, in response to the signals, to activate and deactivate the emission of light to the different areas based at least in part on a customizable assignment; and a shell to cover the light source, the shell having a plurality of areas to receive the light emitted by the light source, each of the plurality of areas including different attributes that are visible when illuminated by the direct emission of light to a corresponding area, wherein the shell includes a plurality of portions that are independently made visible to a user when a corresponding portion of lights is illuminated indicating at least a quantity of messages available via the telecommunications device.

16. The apparatus as recited in claim 15, further comprising a light controller to direct the light source to emit light to the different areas, wherein the light controller is programmable, based at least in part on received user input, to provide the customized assignment of the light to the different areas.

17. The apparatus as recited in claim 16, wherein the light controller is configured to implement user assignment of a first light area with a first type of message that includes a text message and a second light area with a second type of message.

18. The apparatus as recited in claim 15, wherein the signals are associated with the messages received by a telecommunications device.

\* \* \* \* \*